United States Patent [19]

Boyles et al.

[11] Patent Number: 5,169,112

[45] Date of Patent: Dec. 8, 1992

[54] ELECTRONIC SUSPENSION VEHICLE SEAT

[75] Inventors: Bradley S. Boyles, Mequon; Kyle P. Donovan, Milwaukee; Martin L. Maas, Cedar Grove, all of Wis.

[73] Assignee: Milsco Manufacturing Company, Milwaukee, Wis.

[21] Appl. No.: 750,095

[22] Filed: Aug. 26, 1991

[51] Int. Cl.⁵ .............................................. F16M 13/00
[52] U.S. Cl. ................................ 248/550; 248/406.2; 248/421
[58] Field of Search ............... 248/550, 574, 555, 588, 248/624, 631, 421, 425, 157, 406.2; 296/65.1; 297/345

[56] References Cited

U.S. PATENT DOCUMENTS

| | | | |
|---|---|---|---|
| 4,029,283 | 6/1977 | Swenson et al. | 248/575 X |
| 4,198,025 | 4/1980 | Lowe et al. | 248/550 |
| 4,213,594 | 7/1980 | Pietsch et al. | 248/550 |
| 4,573,657 | 3/1986 | Sakamoto | 248/575 |
| 4,589,620 | 5/1986 | Sakamoto | 248/550 |
| 4,645,169 | 2/1987 | Mischer | 248/550 |
| 4,659,052 | 4/1987 | Nagata | 248/575 |
| 4,684,100 | 8/1987 | Grassl | 248/550 |
| 4,733,847 | 3/1988 | Grassl | 248/550 |
| 5,058,852 | 10/1991 | Meir et al. | 248/631 X |

Primary Examiner—Ramon O. Ramirez
Attorney, Agent, or Firm—Nilles & Nilles

[57] ABSTRACT

A sprung seat suspension comprising a base frame; a seat carrier frame including height sensor assembly; linkage mounted on the base frame and operative to adjustably, vertically support the seat carrier frame with respect to the base frame and including an actuator which strokes the sensor assembly along a path during vertical movement of the seat carrier frame. A mover is mounted on the base frame and for adjustably vertically displacing the seat carrier frame from the base frame. An extension is connected to the height sensor assembly and the mover for selectively extending the mover. A retractor is connected to the height sensor assembly and the mover for selectively retracting the mover. The sensor assembly comprises a plurality of sensors positioned along the stroke path of the actuator which may be selectively independently activated to selectively activate the extension and retraction as the actuator strokes the sensor assembly.

39 Claims, 11 Drawing Sheets

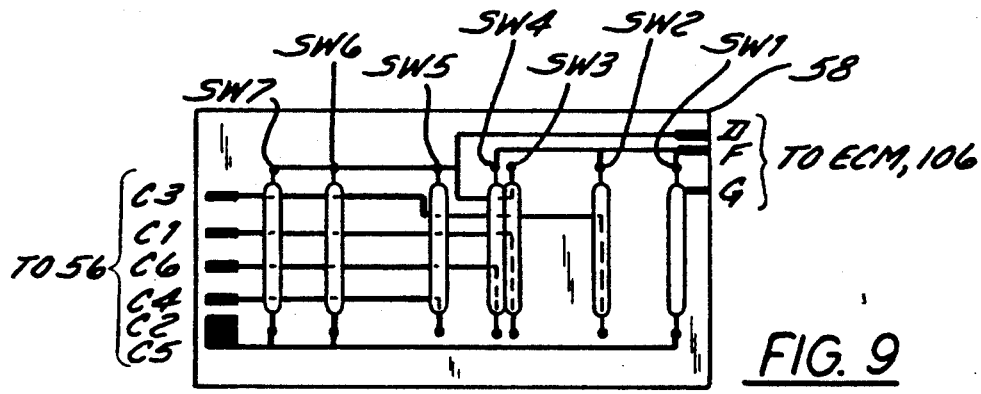
FIG. 9
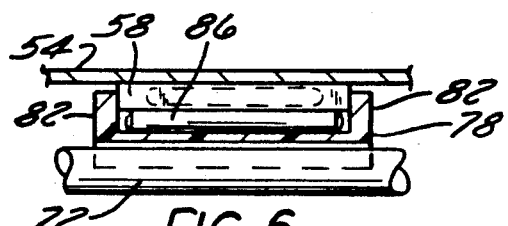
FIG. 6
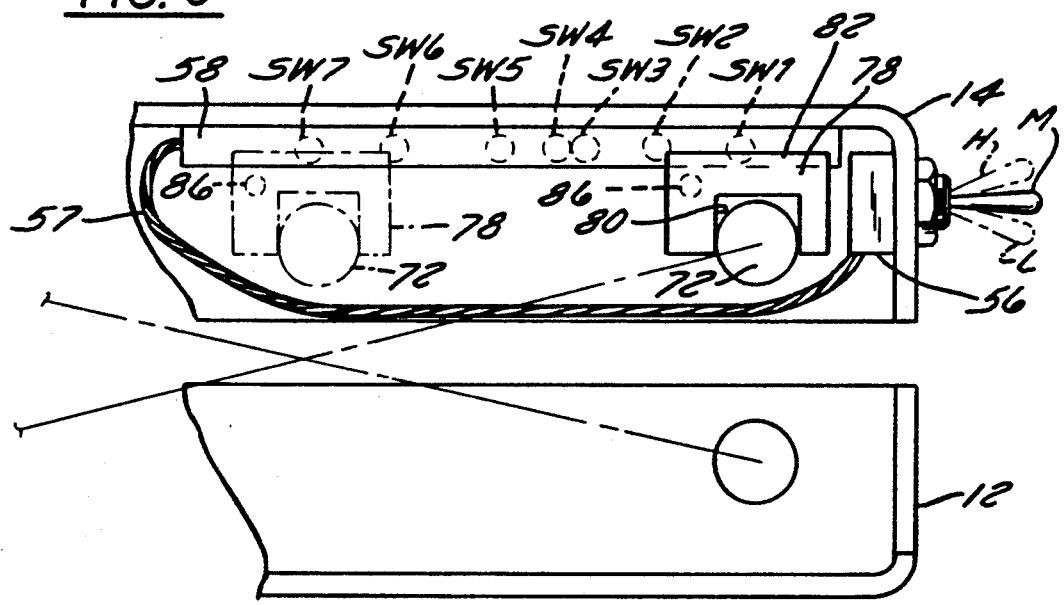
FIG. 5
| HEIGHT POSITION | SW1 | SW2 | SW3 | SW4 | SW5 | SW6 | SW7 |
|---|---|---|---|---|---|---|---|
| LOW | FILL | OFF | DUMP | OFF | DUMP | DUMP | DUMP |
| MID | FILL | FILL | OFF | OFF | DUMP | DUMP | DUMP |
| HIGH | FILL | FILL | OFF | FILL | OFF | DUMP | DUMP |
FIG. 11

ELECTRONIC SUSPENSION VEHICLE SEAT

BACKGROUND OF THE INVENTION

1. Field of the Invention

This invention pertains to sprung seat suspensions for vehicles requiring height adjustment and/or weight compensation means therefor.

2. Description of the Prior Art

There are many different types of height adjustable vehicle seats which function to provide increased comfort to the seat occupant over varying terrain. Most such seats have a seat portion which is mounted on a base portion by means of a spring, damper, and linkage which isolate the seat and its occupant from vibration of the cab or frame on which the base portion of the seat is mounted. Instead of a conventional mechanical coiled steel spring, such as disclosed in U.S. Pat. Nos. 4,029,283, 4,072,287, and 4,344,597, air springs containing compressed gas have been used to not only provide the necessary isolation from vibration but to raise and lower the height of the seat as well. The air spring is valved to increase or decrease the pressure within the spring to support the externally applied load of the seat and the occupant, and to increase or decrease the volume of air within the spring to raise and lower the air spring to adjust the seat to the desired height.

The valve or valves used to increase or decrease the pressure and/or volume of the air may be manually activated by a lever or knob which, when actuated, in one direction or the other, increases or decreases the pressure and/or volume of the air within the air spring as desired. The primary drawback of the manually activated system is that each new occupant must reset the seat height for his weight. In a more complicated air spring seat apparatus, as disclosed in U.S. Pat. No. 4,733,847, the adjustment means set by the seat occupant, which in turn mechanically actuates the air spring valves for changing the pressure and volume of air within the air spring, are used for both weight and height adjustment. The actuator is in the form of a cam shaft so that linear height-wise movement of the seat frame is converted into an angular movement of the cam shaft to permit accurate control of the air spring valve means.

In U.S. Pat. No. 4,198,025, an air spring adjustable seat is disclosed which is able to sense seat height thereby actuating valve means to allow compressed gas to enter or leave the gas spring until the seat has returned to its selected ride position. In order to adjust seat height, a mechanical assembly comprising a vertically journaled lead screw which supports a nut anchored against rotation is used. The vertical distance of the nut from a selected height is sensed by a potentiometer. The upward and downward movement of the nut as a result of vertical movement of the seat varies the potentiometer. The potentiometer is in turn connected to an automatic ride control circuit which moves a valve means which in turn causes air, provided by external compressor means, to enter or leave the spring as needed. In order to effect seat height adjustment, the nut is rotated towards or away from the seat by an electric motor provided with a pinion arranged to rotate the lead screw by engagement with a gear wheel mounted on the upper end of the lead screw. Changing the position of the nut in turn varies the potentiometer which in turn moves the air valves under control of the ride control circuit to bring the seat to its newly selected position.

The complex mechanical linkage assemblies of the above prior art air spring adjustable seats are subject to lost motion due to the number of components required to provide said adjustment and contain numerous potential failure points due to the complexity of the mechanical linkage, and therefore are less than desirable. Furthermore, in prior art suspensions that do not have a self-leveling feature, when the operator exits the vehicle, the seat will extend to and remain at its maximum extended height, placing the seat in close proximity to the controls making entry back into the vehicle difficult. Therefore, the self-leveling suspension eliminates the need to adjust the seat when reentering the vehicle, if the seat is too close to the controls.

A simplified spring adjustable seat which eliminates the mechanical position-sensing linkage assemblies, which electronically monitors the seat height position, and which fully and automatically adjusts the pressure and volume within the spring according to the weight of the occupant and the selected seat height position without the need for an independent fluid source, would be of great benefit.

SUMMARY OF THE INVENTION

An adjustable electronic controlled suspension seat is disclosed which comprises a base frame, a seat carrier frame, electronic control module means, electronic height sensor assembly means, a linkage mounted on the base frame and including actuator means which strokes the height sensor assembly means during vertical movement of the seat carrier frame, a spring mover means mounted between the base frame and the linkage, and extension and retraction means for adjusting the mover means. The height sensor assembly means comprises a plurality of sensor means which are stroked by the actuator means of the linkage as the seat carrier frame moves up and down. The sensor means contained in the height sensor assembly are selectively activated in accordance with the desired, selected seat height range and, in conjunction with the actuator means, the electronic control module and mover means, maintain the seat at the mid-position of the electronically preselected seat height range, fully and automatically adjusting for weight differences between different occupants of the seat while maintaining selected seat height.

The desired seat height range is selected by way of a multi-position electrical switch mounted in any convenient location in the vehicle such as on the suspension, on an armrest, joystick, or cab panel. The multi-position switch may be set to any one of a number of positions to select low, medium, and high seat height ranges. The switch activates a different plurality of sensor means in the height sensor assembly means for each desired seat height. In particular, in a preferred embodiment, for a given selected seat height, a set of sensor means in the height sensor assembly means mounted on the underside of the seat carrier frame are activated. The sensor means, which may be magnetically controlled switches, or optical or mechanical switches, are stroked or passed over by the actuator, which may be a magnet, or light source, or mechanical part, during vertical movement of the seat. A number of the switches in the activated set may correspond to the low end of the desired seat height range, having a mid-position, and the remaining switches in the set may correspond to the high end of the desired seat height range. The fore-aft position of the sensor assembly itself may be adjusted thereby providing infinitely variable seat height adjustment.

Assuming the seat is at the mid-position of the selected seat height range, if the seat height drops too low, due to a heavier occupant taking the seat, for instance, the linkage collapses and the actuator means mounted on the linkage strokes over the sensor means corresponding to the low end of the desired seat height range which causes that sensor means to close and activate the extension means to adjust the mover upwardly and raise the seat toward the mid-position of the desired range. When the seat travels too far in the opposite direction, such as when a lighter occupant takes the seat, and passes over the sensor means corresponding to the high end of the desired seat height range, the sensor means activates a retraction means which adjusts the mover means downwardly and lowers the seat towards the mid-position. Thus, for a given selected seat height, if a seat occupant of different weight occupies the seat, the volume and pressure within the mover means will be automatically adjusted to bring the seat to the desired mid-position without the need for the occupant to reset any seat height control. Furthermore, as the operator exits the vehicle when the system is powered, the seat will extend to its maximum height due to the large decrease in supported mass and then readjust to the selected seat height due to the self-leveling operation of the suspension.

A built-in ride-protection-zone at the upper and lower ends of seat travel is provided by additional sensor means in the seat height sensor assembly which, in a preferred embodiment, are continuously activated. The ride-protection zone at the low end of the seat travel is provided by one or a plurality of sensor means which are continuously activated, regardless of the position of the selected seat height range so that when stroked by the actuator means as the linkage collapses, cause the extension means to turn on and increase the volume in the mover means to bring the seat up to the selected mid-position.

At the upper end of the seat travel, the ride-protection zone is achieved by one or a plurality of sensor means which are continuously active so that when stroked by the actuator as the linkage extends, cause the retraction means to turn on and decrease the volume within the spring mover means tending the seat back towards the selected mid-position. In this way, the seat is prevented from moving to the mechanical limits of its travel either up or down which might otherwise cause discomfort to the rider. Down- and up-stop bumpers may be provided to reduce the effect of extra-ordinary downward or upward peak accelerations and metal on metal contact at the lower and upper ends of seat travel.

Continuous adjustment of the mover means due to short-lived perturbations in seat height, is prevented by delay circuitry in an electronic control module. The module is connected to the height sensor assembly and extension and retraction means and delays operation of the extension and retraction means if the actuator strokes across the activated sensor means in less than a prescribed period of time. This prevents adjustment of the mover means when unnecessary as during vibration due to terrain or quick repositioning of the seat occupant.

In an air spring mover means embodiment, the seat may preferably operate with a self-contained air source so that it need not be dependent on external air source means or it may be operated with supplied vehicle air.

In a hydraulic cylinder mover means embodiment, the seat may operate using an external source of hydraulic fluid. In yet another embodiment, the mover means may comprise a mechanical spring and motor operated screw thread which raises and lowers the seat in response to signals from the electronic control module and the height sensor assembly.

The adjustable electronic sprung seat of the present invention is extremely reliable because it does not employ mechanical linkages to sense height or position of the seat. Seat height adjustment and automatic weight sensing is performed electronically by the sensor means and therefore there is no need for mechanical linkages to either select or sense seat height. The electronic seat adjustment system of the present invention thus also provides truly automatic and hands-off adjustment for the weight of the occupant. No resetting of the system is required even when an occupant of different weight takes over the seat.

The electronics of the spring seat are modular and therefore may be removed as individual components for ease of servicing. In a preferred embodiment, the height sensor assembly, electronic control module, extension and retraction means and multi-position electrical switch are independent of each other and one may be repaired without affecting the other parts.

In a preferred scissors linkage embodiment, the scissors arm or pan is a one piece formed structure that provides more torsional rigidity than individual scissors linkage arms and provides a protected mounting surface for compact mounting of the spring mover means, extension and retraction means, and electronic control module. The scissors linkage therefore also provides a low collapsed height so that installation in various cab applications is more versatile, made easier, and no more than a minimum of cab room is necessary. The suspension of the present invention may also employ a parallelogram linkage or a back mounted structure.

Further provided is a damper connected between the base frame and the seat carrier frame to assist in attenuating vibrations of the seat in order to isolate the seat carrier frame from the base. Tether means connected between the base frame and the carrier seat frame are also provided to meet the pull test requirement with respect to seat belts.

DESCRIPTION OF THE DRAWINGS

FIG. 5 is a side elevational view of an actuator and height sensor assembly and three position switch of a suspension in accordance with the present invention;

FIG. 6 is a frontal view of an actuator and height sensor assembly in accordance with the present invention;

FIG. 9 is a schematic of reed switch sensor means in a height sensor assembly in accordance with the present invention;

FIG. 11 is a chart showing the activation status of sensor means versus selected seat height position in a suspension in accordance with the present invention;

DESCRIPTION OF THE PREFERRED EMBODIMENTS

Figure 1:
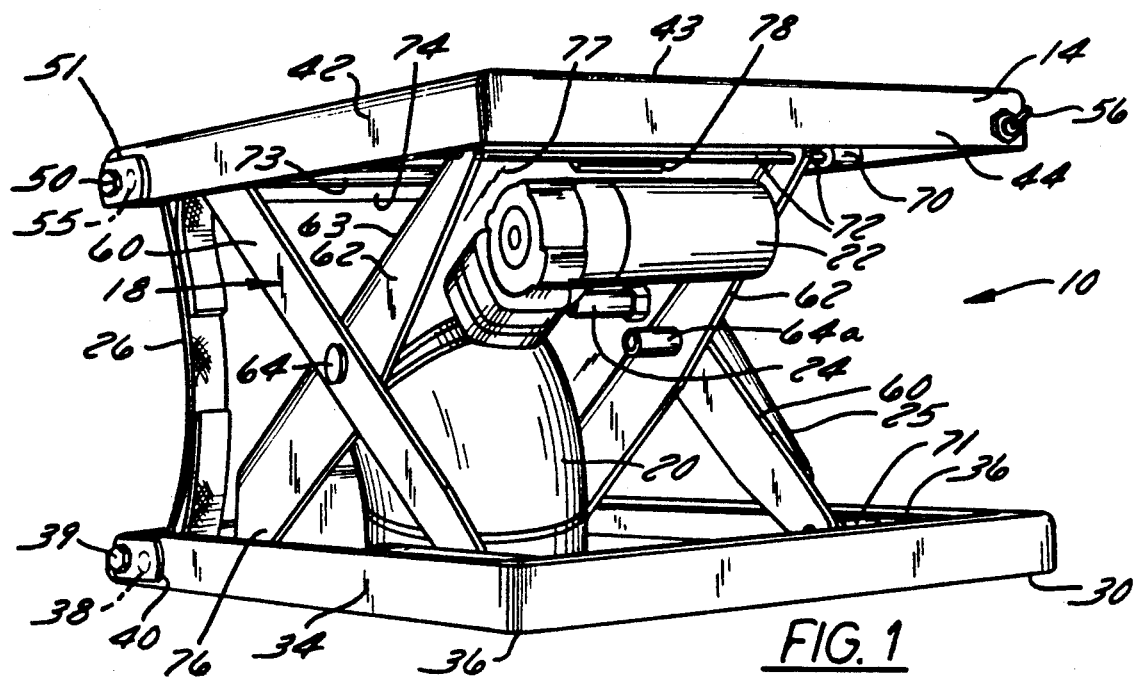
FIG. 1 is a perspective view of a scissors linkage suspension in accordance with the present invention.

Shown in FIGS. 1, 2, 3, and 4 is a preferred seat adjust assembly 10 comprising base frame 12, seat carrier frame 14, seat cushion 16 disposed on the seat carrier frame, and linkage 18, which may be a scissors linkage, connected between the base frame 12 and the seat carrier frame 14. The seat adjust assembly 10 further comprises mover means which may be an air spring 20 connected between the base frame 12 and the scissors linkage 18, extension means 22 which may be a compressor and retraction means 24 which may be a solenoid valve 24 mounted on the scissors linkage 18 and operatively connected to a height sensor assembly 58; and damper 25 and tethers 26 connected between the base frame 12 and the seat carrier frame 14. The air spring 20, compressor 22, and solenoid 24, are shown as well in FIG. 3 which additionally shows height sensor assembly 58, fully described below, mounted on the underside of seat carrier frame 14, best shown in FIG. 4.

A formed steel housing 30 has provisions for conventional mounting of the seat and seat assembly 10 to a vehicle frame or cab. In the interior of the formed steel housing 30 and opposed to each other are roller channels 36 at the forward end of the housing 30. The longitudinal axes of the roller channels 36 are oriented parallel to the longitudinal (forward-aft) axis of the seat assembly 10.

Figure 2:
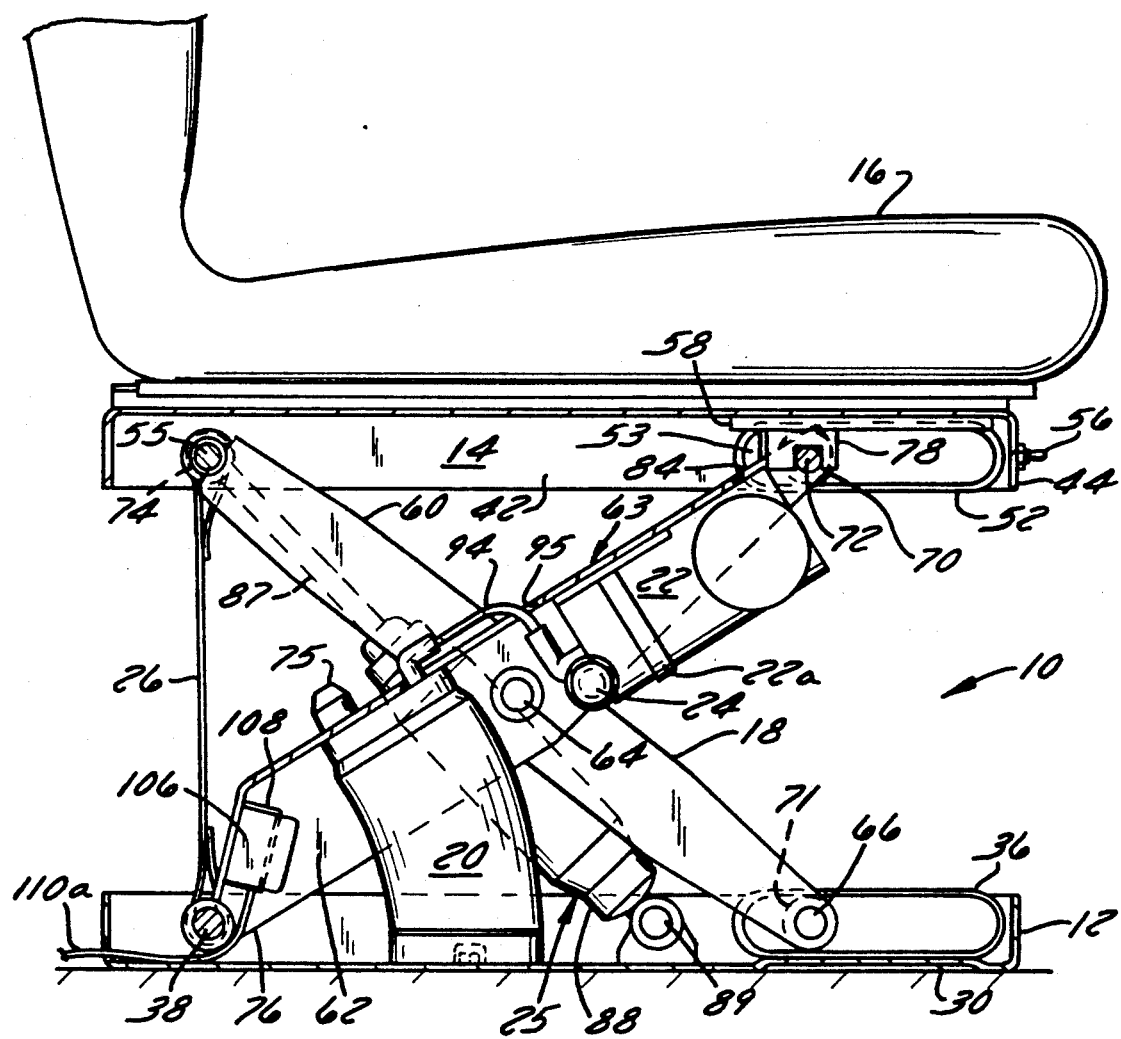
FIG. 2 is a side view of the scissors linkage suspension of FIG. 1 including a seat.

As best seen in FIGS. 1 and 2 the roller channels 36 are mounted against the bottom surface of the housing 30 and are open toward each other as well as toward the center of the housing 30. Housing 30 also includes mounting axis 38 to which the rear portion of the inner arm 62, referred to as scissors pan 62, of the scissors linkage 18 is mounted at mounting axis 38 with pivot shaft assembly 40 and fastener 39. The mounting axis 38 is not seen in FIG. 1 because it is covered by pivot shaft assembly 40.

Seat carrier frame 14 comprises a formed steel housing 42, and conventional mounting of a seat thereto may be made.

Figure 4:
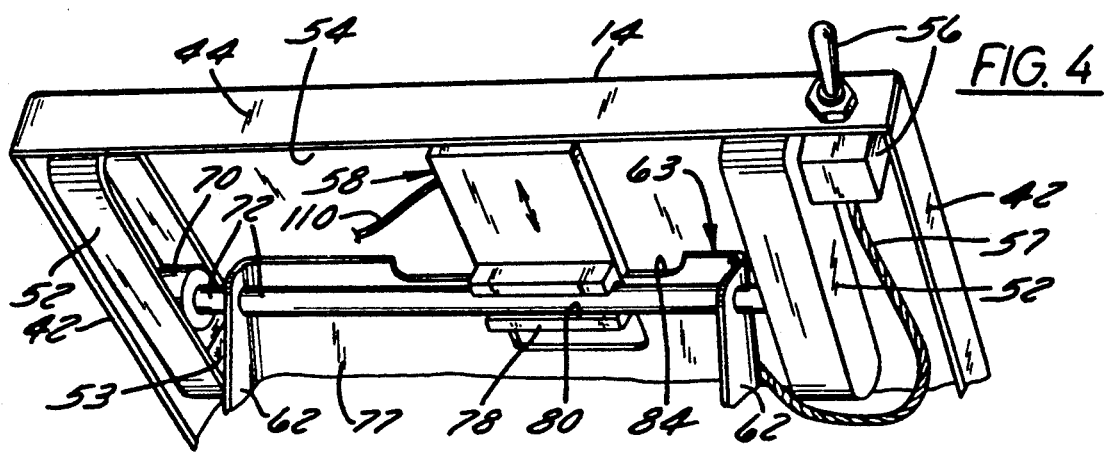
FIG. 4 is a fragmentary perspective view taken from the underside of the scissors linkage suspension of FIG. 1.

Further comprising seat carrier frame 14 are roller channels 52, similar to opposing roller channels 36 on the base frame 12, the roller channels 52 being oriented along the longitudinal axis of the seat assembly 10 and along the side walls 42 of the seat carrier frame 14. As best seen in FIG. 4, the seat carrier frame roller channels 52 are closed on three sides and open toward each other and toward the center of the seat carrier frame 14. The roller channels 52 have up stop bumpers 53 mounted therein. Seat carrier frame 14 also comprises undersurface 54 and mounting axis 55 to which the aft, upper portion of the outer arms 60 of the scissors linkage 18 are attached with pivot shaft assembly 51 and fastener 50 further described below. Mounting axis 55 is not seen in FIG. 1; because it is covered by pivot shaft assembly 51.

Mounted to the forward wall 44 of housing 42 is a 3-position toggle switch 56 having electrical wires 57 extending therefrom. Switch 56 may, however, be mounted in any convenient location such as on an armrest, joystick, or cab panel.

Figure 3:
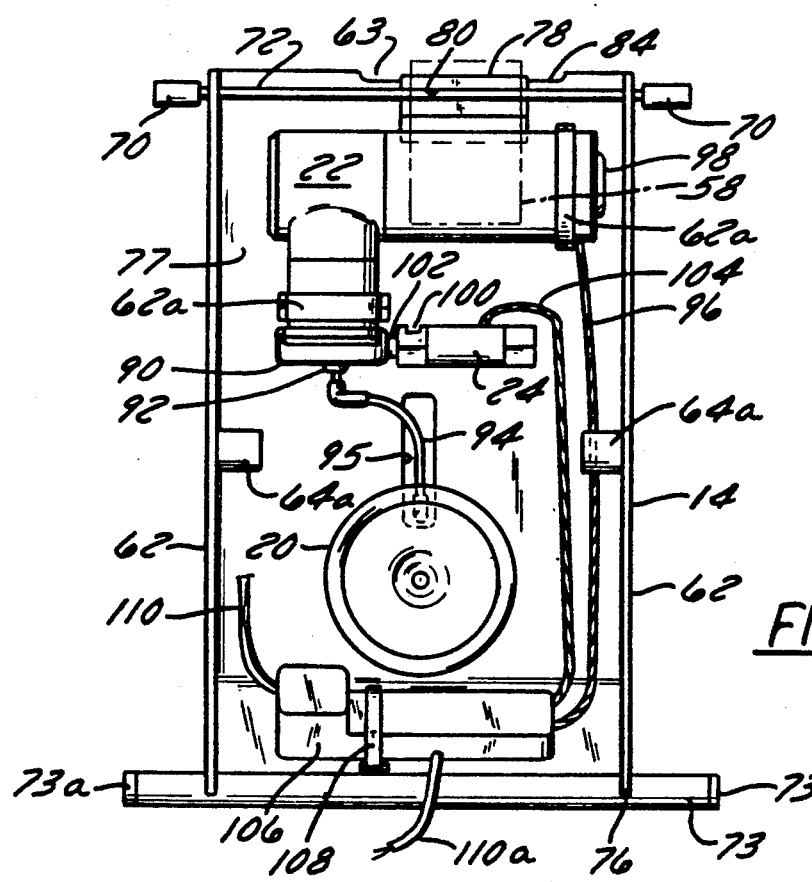
FIG. 3 is a bottom view of the scissors pan of the scissors linkage suspension of FIG. 1.

As FIGS. 3, 4, and 5 best show, mounted to the under surface 54 of seat carrier frame 14 and roughly centrally laterally located at the forward edge thereof is height sensor assembly 58. Height sensor assembly 58 is a generally flat rectangular member connected via electrical wire 57 to 3-position switch 56. Height sensor assembly 58 may have embedded therein sensor means, which may be reed switches, designated SW1-SW7 as shown in FIG. 5. The reed switches SW1-SW7 are magnetically activated so that when a magnet 86 (described below) is in close proximity, the affected switch closes. When the magnet 86 is removed, the switch opens.

The reed switches may preferably comprise miniature single pole, normally open reed switches made by Hamlin, Inc. of Wisconsin. As seen in FIGS. 5 and 6, the switches SW1-SW7 are oriented perpendicular to the longitudinal axis of the seat assembly 10 and spaced with respect to each other, except for SW3 and SW4 which are immediately adjacent each other.

Referring to FIGS. 1 and 2, scissors linkage 18 comprises scissors outer arms 60 pivotally mounted with pivot fastener 64 on either side of and at an angle to scissors pan 62 having upper surface 63. Outer scissors arms 60 are welded to pivot tube 74 which is pivotally mounted to the aft end of the underside 54 of seat carrier frame 14 at mounting axis 55 with the shaft assembly 51. A lower forward roller shaft 66 is welded to outer scissors arms 60 at their opposite forward end and slidably travels on rollers 71 which rotate in opposing roller channels 36.

Scissors pan 62 is welded at its aft end 76 to pivot tube 73 which pivotally mounts at axis 38 on base frame 12 with the shaft assembly 40. The scissors pan 62 extends upwardly to the forward end of seat carrier frame 14. Referring now to undersurface 77 of scissors pan 62, as best shown in FIGS. 1 and 3, the forward end 68 of scissors pan 62 is welded to upper roller shaft 72 to which rollers 70 are mounted and are slidably engaged for travel in roller channels 52 in the same manner as roller shaft 66 of scissors arms 60 is slidably engaged in roller channels 36 on the base frame 12. Scissors pan 62 pivots at bushing 64a relative to scissors arms 60 about pivot pin 64. The aft end 76 of the scissors pan 62 is able to pivot at mounting axis 38 on tube 73 and bearing 73a (FIG. 3). Located on the top surface 63 of scissors pan 62 are rubber down-stop bumpers 75. Attached to scissors linkage 18 and looped around pivot shaft 73 and pivot shaft 74 are tethers 26.

Rotatably mounted on the shaft 72 is an actuator 78 which slidably engages height sensor assembly 58 mounted on the undersurface 54 of the seat carrier frame 14. The actuator 78 has a cut out portion 80 which allows it to seat on shaft 72. Height sensor assembly 58 and actuator 78 are aligned with each other. Cut away portion 84 on the forward end of scissors pan 62 aligns the actuator 78 to slidably engage the height sensor assembly 58 without interference from the scissors pan 62.

As best seen in FIGS. 5 and 6, partially or fully embedded within the actuator 78 is a magnet 86. Magnet 86 may preferably be a cylindrically shaped magnet oriented perpendicular to the longitudinal axis of the seat adjust assembly 10 and parallel to reed switches (sensor means) SW1-SW7 in the height sensor assembly 58. The actuator 78 and magnet 86 are in close proximity to at least one of the reed switches SW1-SW7 embedded in height sensor assembly 58 at all times. The position of the magnet 86 with respect to the switches varies with the position of the scissors linkage 18, in particular of shaft 72, as the seat carrier frame 14 moves up and down.

As shown in FIG. 2, damper 25, aligned generally along outer scissors arms 60, may preferably comprise a conventional shock absorbing element having a base cylinder 88 and an upper piston rod 87. Base cylinder 88 is rotatably mounted at mounting axis 89 within the base frame 12, and piston rod 87 is rotatably mounted within seat carrier frame 14 at mounting axis 55.

Referring again to FIG. 3, the components mounted on the underside 77 of scissors pan 62 are now further identified. Extension means 22 which may be a compressor, is mounted at the forward end of the scissors pan 62 with tie wraps 62a through slots in scissors pan 62. A pad (not shown) is mounted with adhesive between compressor 22 on underside 77 of scissors pan 62. The compressor 22 may preferably comprise a 24 volt 7¼ amp Thomas Industries compressor. The compressor 22 has a major axis that is perpendicular to the longitudinal axis of the seat adjust assembly 10 which terminates in end 98, and a minor axis which runs parallel to the longitudinal axis which terminates in head 90. Out of flange 92 at the head 90 extends air line 94. Air line 94 bends 90° out of the head 90 of the compressor 22 and extends through slot 95 in the upper surface 63 of the scissors pan 62. As best seen in FIG. 2, the air line 94 then bends 90° aft, is oriented along the upper surface 63, and terminates and communicates with the upper end of the air bag 20 through the upper surface 63 of the scissors pan 62. Compressor 22 has electrical cable 96 extending from its end 98, the electrical connection of which will be described below.

Referring again to FIG. 3, the normally closed retraction means 24, which may be a solenoid valve, is connected via connector 102 to the head 90 of the compressor 22. The solenoid dump valve 24 may preferably be a GT Development Co. 24 volt solenoid dump valve which is normally closed. The valve has a sized orifice 100 which controls the flow rate at which air is released from air spring 20. The solenoid valve 24 is interconnected to air line 94 through the head 90 on the compressor 22. Exiting the solenoid valve 24 is an electrical cable 104 which is connected to electronic control module 106 mounted on the aft underside 77 of scissors pan 62.

Electrical cable 96 from the terminal end 98 of the compressor 22 is likewise connected to the electronic control module 106. Electronic control module (ECM) 106 is mounted to the undersurface 77 of the scissors pan 62 with tie wrap 108. Like the other components mounted on the undersurface 77, it is preferably tucked neatly within the confines of the scissors pan 62. Exiting the electronic control module 106 is electrical cable 110 which is connected to the height sensor assembly 58. Height sensor assembly 58 is in turn electrically connected to 3-position switch 56 by wire 57. Electrical cable 110a is mounted between lower pivot shaft 73 of scissors pan 62 and base frame 12 through a hole (not shown) in the aft vertical wall of base frame 12 to a voltage source.

An overall schematic of the relationship of the components discussed above is provided in FIG. 7 in which it can be seen that the 3-position switch 56 is connected electrically to height sensor assembly 58, and used in conjunction with actuator 78, which in turn is electrically connected to the ECM 106 which is connected electrically to both the solenoid valve 24 and compressor 22 which are connected at the compressor head 90. ECM 106 is powered by a voltage supply. Furthermore, compressor 22 is connected via air line 94 to air spring 20.

Electrical Circuit

Figure 8:
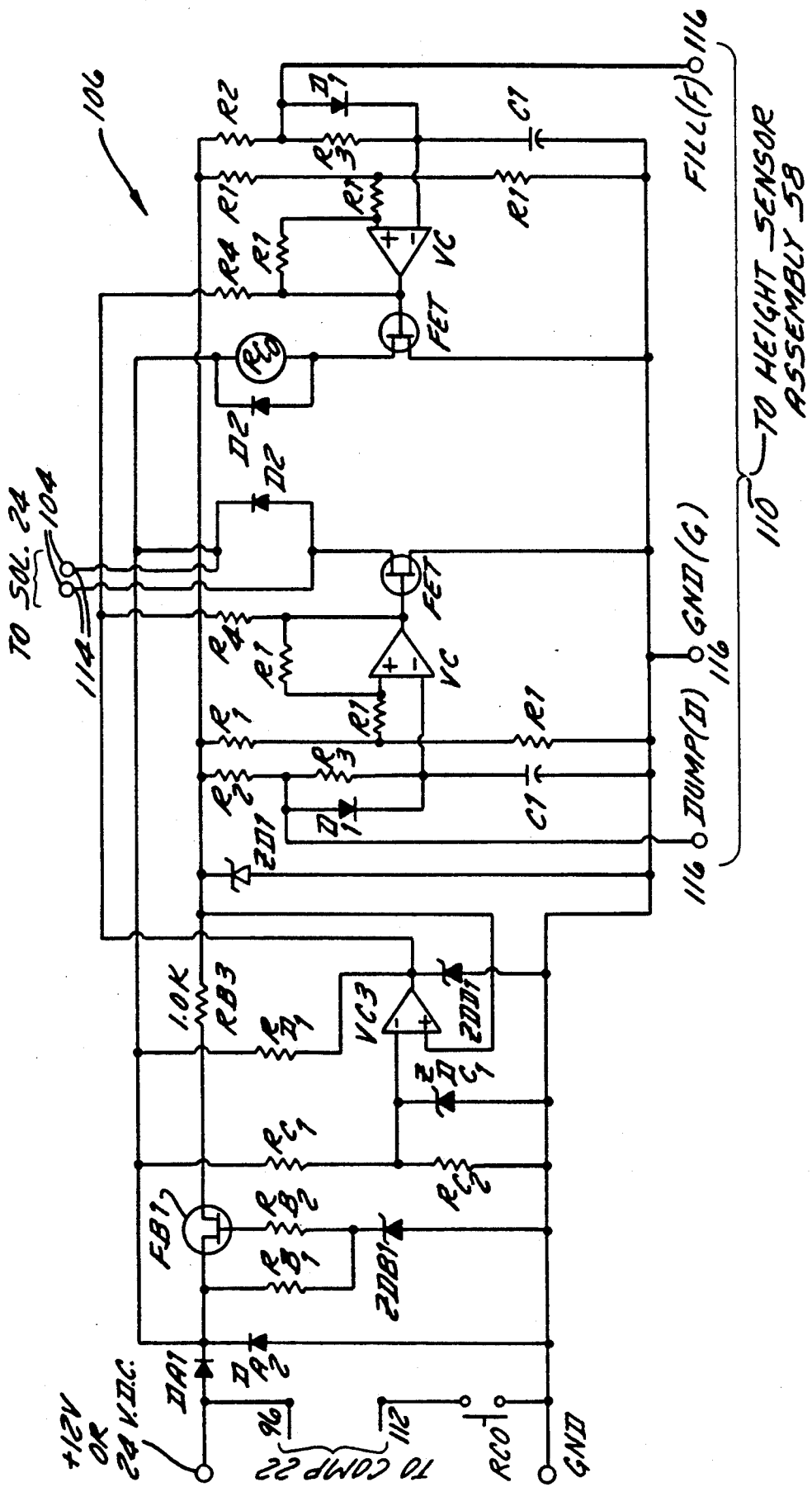
FIG. 8 is a circuit schematic of an electronic control module in accordance with the present invention.

FIG. 8 illustrates the electrical circuit of ECM 106. The electrical cable 96 connects the compressor 22 to the ECM 106 at inputs 112. The electrical cable 104 connects the solenoid 24 to the inputs 114 of the ECM 106. The ECM 106 circuit is connected to the height sensor assembly 58 by electrical cable 110 at inputs 116 which are the dump (D), ground (G), and fill (F) terminals also shown in FIG. 10.

The ECM circuit as shown is grounded at the lower left of the circuit diagram and is connected to a DC power supply through diode DA1. Diode DA2 is connected between ground and the output of diode DA1. This diode pair protects the circuit as well as the solenoid from reverse voltages. The output from this diode pair provides unregulated positive voltage for the circuit 106, and solenoid 24. The combination of FET FB1, resistors RB1, RB2 and RB3, and zener diodes ZDB1 and ZD1, together form a regulating circuit. This circuit takes the unregulated positive voltage output from diode pair DA1 and DA2 and converts it to a positive regulated voltage for use by other parts of the circuitry. In the preferred embodiment, the unregulated positive voltage output from the diode pairs may be any voltage between approximately 12 volts to 200 volts, and the output from the regulation circuitry will be a positive regulated voltage of 8.2 volts. Resistors RB1 and RB2 together with zener diode ZDB1 provide a voltage of 13 volts maximum to the base of FET FB1. The input to FET FB1 is the positive unregulated voltage of up to 200 volts. The output from FET FB1 is a voltage whose magnitude lies between the base voltage of the FET and the voltage across zener diode ZD1 which in the preferred embodiment is ~8.2 volts. Resistors RC1, RC2, RD1, zener diodes ZDC1, ZDD1, and voltage comparator VC3 together form a high voltage shut-off circuit. This circuit keeps the output FETs "turned off" when voltages higher than ~33 volts are present, thus protecting the compressor 22 and solenoid 24 from high voltages. Resistors RC1 and RC2 together with zener diode ZDC1 reduce the input voltage to a value which is within the operating range of voltage comparator VC3. VC3 samples the voltage across RC2. When this voltage is higher than the reference voltage on ZD1, the voltage comparator clamps the drive voltage for the output FETs to ground. The drive voltage for the output FETs is normally obtained from the positive unregulated voltage input through resistor RD1, and is clamped to a maximum voltage of 18 volts by zener diode ZDD1.

The remaining circuit comprises two nearly identical halves, one for controlling the solenoid valve 24 (left side) and the other for controlling the compressor 22 (right side). Each side basically comprises an operational amplifier comparator circuit comprising networked resistors R1, which may in a preferred embodiment comprise 4.7M Ohm resistors, connected to the positive terminal of a voltage comparator VC. Resistor R2, and resistor R3 in parallel with diode D1, and capacitor C1 are connected to the negative input of the voltage comparator VC. The dump terminal (D) line is taken off the circuit at the junction between resistor R2 and the upper node of parallel $D_1$-$R_3$. $R_2$ and $R_3$ may in a preferred embodiment comprise a 470K Ohm and a 2.2M Ohm resistor respectively. Capacitor C1 may in a preferred embodiment, and depending upon the delay characteristics of the circuit desired, as will be more fully described below, be a 0.33 $\mu$F capacitor.

The output of the voltage comparator VC is connected to the input of field-effect transistor FET, one output terminal of which is tied to ground and the other tied to a terminal of the solenoid valve 24. Diode D2 is connected in parallel with the solenoid terminals 104 and 114. A typical power source for the present invention may comprise a 12 volt battery, two 12 volt batteries, or a single 24 volt battery depending upon the power source of the vehicle on which the seat adjust assembly 10 is installed.

Figure 7:
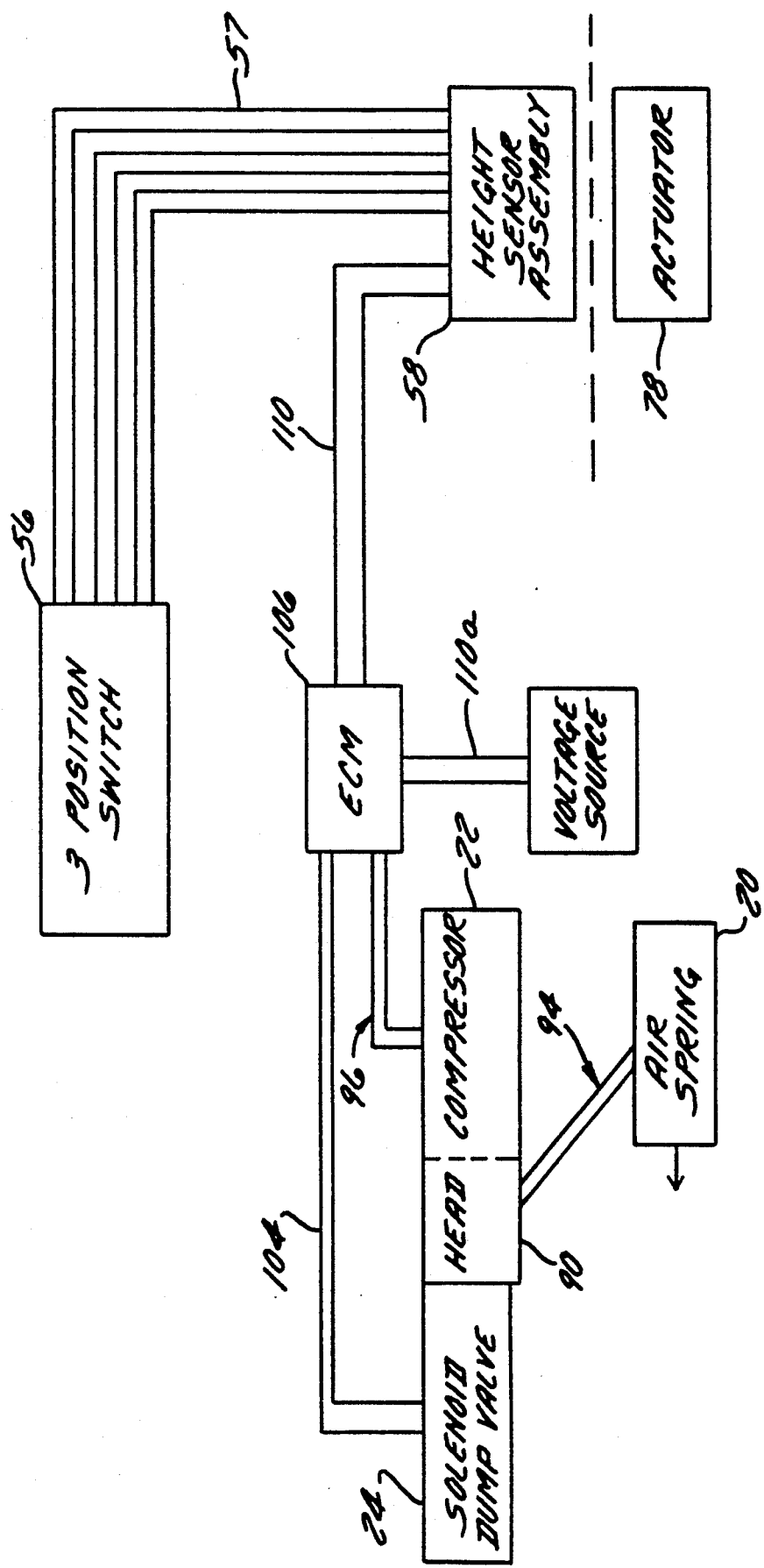
FIG. 7 is a schematic block diagram of a suspension in accordance with the present invention.

The right side of the circuit of the ECM 106 depicted in FIG. 7 is virtually identical, with the exception of some of the rated values of the components, to the left side and need not be explained except to state that the fill (F) terminal is taken off the juncture between the resistor R2 and the parallel D1-R3 pair. Furthermore, instead of the output of the second FET transistor being connected to the solenoid dump valve 24, it is connected to the compressor relay coil RCO. Diode D2 is connected in parallel with compressor relay coil RCO. The terminals D, G, and F on the ECM 106 circuit are connected to the corresponding terminals D, G, and F on the height sensor assembly 58.

Figure 10:
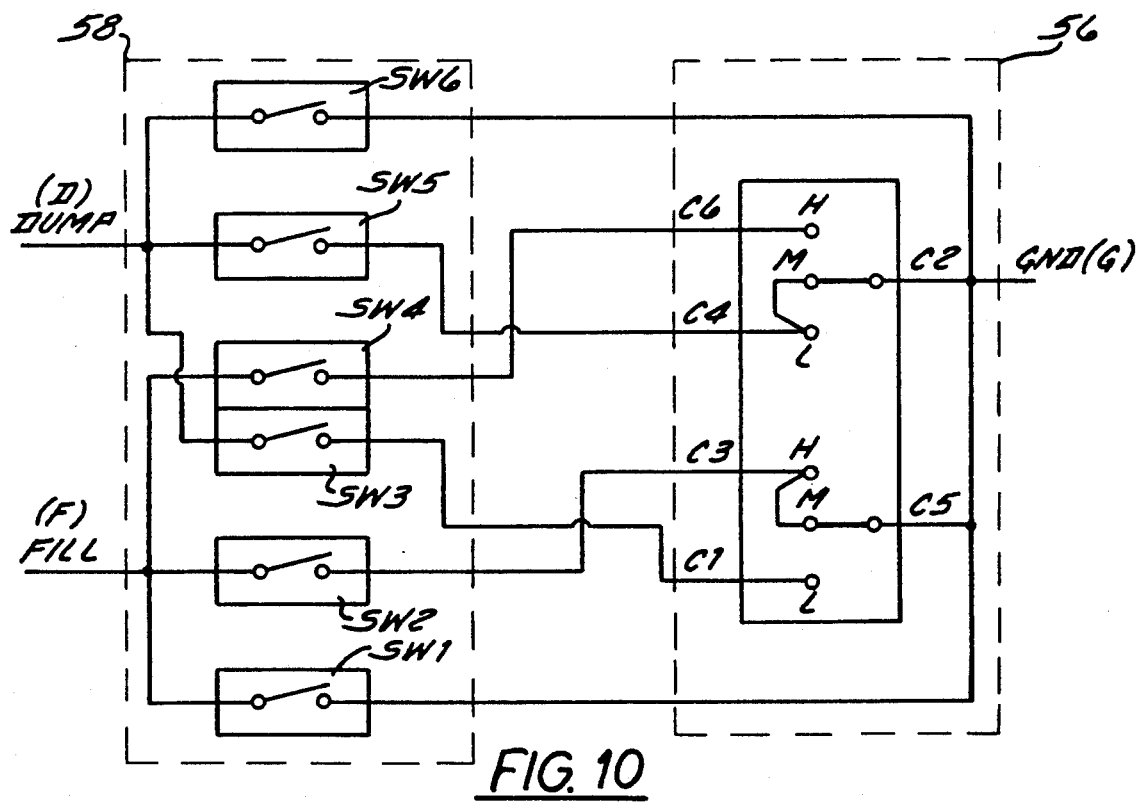
FIG. 10 is a circuit schematic of the interconnection of the sensor means and a three position switch in accordance with the present invention.

The terminals of height sensor assembly 58 are depicted in FIG. 9. As can be seen, the D, G, F, terminals are at the right end, and the terminals C1-C6 at the left end of the height sensor assembly 58. Terminals C1-C6 are connected to the 3-position electrical switch mounted on the seat carrier frame 14 (via wire 57). A schematic representation of the 3-position electrical switch 56, which has positions H, M, and L corresponding to high, medium, and low seat height ranges, and the switches embodied in the height sensor assembly 58 is shown in FIG. 10. The height sensor assembly 58 is mounted on the undersurface 54 of seat carrier frame 14 so that the right end of the assembly 58 having reed switch SW1 is forward, and so that the actuator means 78 does not extend forward beyond the range of switch SW1 even at the lowest or collapsed end of the seat height travel. Also, the assembly 58 is mounted so that the actuator means 78 cannot extend aft beyond the range of the last reed switch SW7 even at the upper extreme of seat travel.

Referring now to FIGS. 9 and 10, showing the connection of the reed switches in the height sensor assembly 58 with the ECM 106 and the 3-position switch 56, the reed switch designated SW1 is continuously activated as a fill switch by virtue of its being connected directly between the fill terminal F of the ECM 106 and the contact designated C5 (ground) of the 3-position switch 56. The switch designated SW2 is connected between the fill terminal F of the ECM 106 and the contact designated C3 of the 3-position switch 56 and is selectively activated as a fill switch when the switch 56 is in the H or M position. The switch designated SW4 is connected between the fill terminal of ECM 106 and the contact designated C6 of the switch 56, and is selectively activated when the switch 56 is in the position marked H.

The switch designated SW3 is connected between the dump terminal D of the ECM 106 and the contact designated C1 of the switch 56, and is selectively activated when the switch 56 is in the position marked L. The switch designated SW5 is connected between the dump terminal D of the ECM 106 and the contact designated C4 of the switch 56, and is selectively activated when the switch 56 is in the position marked M or L. The switch designated SW6 is connected between the dump terminal D of the ECM 106 and the grounded contact C2 of the switch 56. It is continuously activated. The switch designated SW7 shown in FIG. 9 but not shown in FIG. 10 is an optional switch that may be connected in a manner similar to the switch designated SW6. The switches designated SW3 and SW4 may, as shown in the preferred embodiment, comprise two single-pole single-throw reed switches or, may comprise one double-pole reed switch, if available.

It can be seen from FIG. 11 that when the switch 56 is in the upper position marked H (high) seat height range, switches SW1, SW2, and SW4 are activated as fill switches, the switches designated SW3 and SW5 are not activated and the switches designated SW6 and optional SW7 are activated as dump switches.

It can be seen from FIG. 11 that when the switch 56 is in the middle position M (mid) the switches SW1 and SW2 are activated as fill switches, switches designated SW3 and SW4 are not activated and the switches designated SW5, SW6, SW7 are activated as dump switches.

Furthermore, when the switch 56 is in the position marked L or low, the switch designated SW1 is activated as a fill switch, switches designated SW2 and SW4 are not activated and the reed switches designated SW3, SW5, SW6, SW7, are activated as dump switches.

OPERATION

Seat adjust assembly 10 may preferably be connected so as to be activated only when the ignition of the vehicle is turned on. When there is no power to the system, the solenoid valve 24 is closed. Therefore, the system will not release any air from the air bag and the operator will remain in the same height position until the power is restored to the system. This will eliminate the possibility of the operator bleeding the air out of the system as in a manually operated air valve and ride on an unsprung seat which could injure the operator.

Assuming the seat 16 is unoccupied when the seat adjust assembly 10 is activated by turning on the vehicle ignition, the compressor 22, solenoid dump valve 24, height sensor assembly 58, and electronic control module 106 become active, and automatically maintain the seat at the mid-position of the seat height range selected via the 3-position switch 56. The seat will be maintained in the height range corresponding to the position of the set of reed switches in the height sensor assembly 58 activated by the 3-position switch 56. Assuming the switch 56 is at the position marked M (medium height) when the system is turned on, switches SW1, SW2, SW5, SW6 and SW7 are active. SW1 and SW2 are activated as fill switches and SW5, SW6 and SW7 are activated as dump switches, and the magnet 86 embedded in the actuator 78 will tend toward the mid-point or range between SW2 and SW5, and accordingly maintain the seat at the mid-position of the selected seat height range M. The halfway point or mid-range between switches SW2 and SW5 correspond to the mid-position of the seat carrier frame 14 for that selected height range (M).

Assuming the driver of the vehicle then occupies the seat 16 on the seat carrier frame 14, the weight of the occupant will initially temporarily cause the seat carrier frame 14 to lower somewhat, thus partially collapsing the scissors linkage 18. As the scissors linkage 18 partially collapses, the lower forward roller shaft 66 of the outer scissors arms 60 moves forward within the roller channels 36 on the base frame 12. At the same time, the upper roller shaft 72 moves forward within the roller channels 52 on the seat carrier frame 14. The rollers 70 on the shaft 72 ensure that the forward end of the scissors pan 62 moves smoothly within the roller channels 52. Similar rollers 71 on the forward ends of the scissors arms 60 ensure that the outer scissors arms 60 travel smoothly within the roller channels 36 on the base frame 12.

As the scissors linkage continues to collapse under the weight of the newly seated occupant, the outer scissors arms 60 pivot with respect to the scissors pan 62 at pivot pin 64. At the same time, the pivot tube 74 of the outer scissors arms 60 rotate at mounting axis 55 on the seat carrier frame 14, and the pivot tube 73 rotates at the pivot axis 38 at the base frame 12.

When the shaft 72 has moved sufficiently forward within the roller channels 52, the actuator 78 held laterally aligned with the height sensor assembly 58 and mounted on the shaft 72 begins to move near switch SW2. As the magnet 86 in the magnet carrier 78 nears the fill switches SW1 and SW2, the switch in proximity to the magnet 86 closes, connecting the right hand side of the ECM 106 circuit to ground. The capacitor C1 then begins to discharge through the resistor R3. When the voltage across the capacitor C1 drops below the reference voltage determined by the network of resistors R1, the voltage comparator VC output goes high, which turns on the field effect transistor FET, which turns on the compressor relay RCO, which turns on the compressor 22 through electrical cable 96 connected to the terminal 98 of the compressor 22. Compressed air then passes through head 90, into air line 94, and into the upper end of the air spring 20. Filling air spring 20 forces the scissors linkage 18 to extend and forces the seat carrier frame upward via the force imposed upon it by the upper ends of the scissors arms 60 and scissors pan 62.

As the scissors linkage 18 begins to extend, the shaft 72 connected at the forward end thereof begins to move aft, stroking the height sensor assembly 58 in a rearward direction with the actuator 78. When the magnet 86 is no longer proximal switches SS1 and SW2, switches SW1 and SW2 reopen which opens the connection between the fill terminal F of the ECM 106 and ground through the switch 56. The capacitor C1 then begins to recharge to its initial voltage through resistors R2, R3 and diode D1, after C1 recharges to a level above the reference voltage. The voltage comparator VC output goes low, which turns off the output of the FET, which turns off the relay RCO, which turns off the compressor. Thereafter, the seat stabilizes at the mid-position of the selected M seat height range.

Now the operation of the seat adjust assembly 10 will be described for the situation where the occupant vacates the seat with the switch 56 still at M. Generally, as the operator exits the vehicle, when the system is powered, the seat will extend to its maximum height due to the large reduction in supported mass and then readjust to the selected set height (H,M,L) due to the self-leveling operation of the suspension. More specifically, as the occupant begins to leave the seat 16, the downward force of the occupant upon the scissors linkage 18 lessens and the scissors linkage 18 begins to extend. As the scissors linkage 18 begins to extend, the shaft 72 at the forward end of the scissors pan 62 begins to move aft stroking the height sensor assembly 58 in a rearward direction. As the occupant continues to get up, the magnet 86 in the actuator 78 strokes over the reed switches SW3 and SW4. Because the reed switches SW3 and SW4 are not active when the switch 56 in the position marked M, they cause no further change in the system.

But as the magnet 86 continues to move aftward and eventually passes in proximity to switches SW5, SW6 and SW7, switches SW5, SW6 or SW7 close, connecting dump terminal D with ground through the switch 56. Completion of the dump circuit begins to discharge the capacitor C1 on the left side of the ECM 106 circuit. When the voltage across capacitor C1 drops below the reference voltage determined by networked resistors R1, the discharge time being dependent upon the value of resistor R3, which in a preferred embodiment is 2.2M, the output of the voltage compressor VC goes high, which turns on the field effect transistor FET and opens solenoid valve 24 through electrical cable 104.

The open solenoid valve 24 allows air to escape from the air spring 20 through air line 94 through compressor head 90 through connector 102 and out the orifice 100 on the solenoid valve 24. The escaping air causes the scissor linkage 18 to begin to collapse under the weight of the seat and move the shaft 72 on the forward end of the scissor pan 62 forward, away from switches SW5, SW6 and SW7. When the magnet 86 carried by the actuator 78 is no longer proximal to the switch SW5, SW6 and SW7, switches SW5, SW6 and SW7 reopen, thereby opening the dump terminal D circuit and causing the capacitor C1 to begin to recharge to a level above the reference voltage which in turn causes the voltage comparator VC output to go low, which turns off the output of the FET, which turns off the solenoid valve 24. The time required for the capacitor C1 to recharge once either the dump terminal or fill terminal is reopened by one of the reed switches, can be varied by varying the value of C1 with respect to its associated resistor R2. Thus, the seat with no occupant, will remain at the mid-position of the selected seat height region M. (If the vehicle is then turned off, the seat height will remain the same.)

It should be noted that the pressure in the air spring 20 needed to maintain a lighter occupant at the mid-position of the desired seat height range is less than the pressure in the air spring 20 that is required to support a heavier occupant at the mid-position of the same seat height range. Due to the lower pressure in air spring 20, the "ride" of the seat for the subsequent rider will be softer and more comfortable for him. This automatic weight compensation capability of the present invention assures a comfortable and suitable ride for occupants of various weights without any further adjustment.

During normal vehicle operation, the air spring 20 absorbs the minor shocks and vibrations generated by the terrain below. The seat carrier frame 14 will move up and down to a small degree as the vehicle moves along. The damper assists in attenuating the output amplitude of the seat assembly generated by the low frequency inputs of the vehicle.

The ECM 106 circuit, however, prevents continuous or frequent activation of either the compressor 22 or solenoid valve 24 when vertical movement of the seat outside of the selected seat height range (defined by the active set of reed switches selected by the switch 56) is of only short duration. Such temporary and intermittent vertical movement of the seat while the vehicle moves along the terrain is normal and is not cause to either add or release air from the air spring 20.

The discharge time of the capacitor C1 delays the activation of the compressor 22. Assuming that the magnet 86 in the actuator 78 quickly passes over or in close proximity to the reed switch SW2, i.e., passes in close proximity to and then away from the reed switch SW2 in a duration that is less than the discharge time of the capacitor C1, the compressor will not turn on. The discharge time of the capacitor C1 may be varied by altering the values of the capacitor C1 and the resistors R1. Any SW switch closed by the magnet 86 will not affect the system unless the magnet remains near that switch for a duration that is greater than the discharge time of capacitor C1. Consequently, if the magnet 86 passes over any active reed switch and outside the desired seat height range (defined by the active set of switches) but returns within the region within the prescribed time, neither the compressor 22 nor the solenoid dump valve 24 will activate, thus eliminating unnecessary operation of the compressor and solenoid.

The resistor R1 between the positive input and the output of each of the voltage comparator OA is a conventional feedback resistor which provides hysteresis in the circuit. The desired hysteresis caused by the R1 feedback resistor eliminates unnecessary on and off switching due to signal noise.

Assuming the switch 56 is still at "M", the operation of the seat adjust assembly 10 will now be described for the situation where the vehicle passes over an extraordinary feature in the terrain which causes a large vertical seat movement. Although typically, vertical movement of the seat during operation of a vehicle will be limited to the region between the selected active set of reed switches, sometimes a large terrain feature will cause the seat to move up or down to a greater degree. Such motion is compensated for by the suspension adjust assembly 10 of the present invention. If the seat carrier frame 14 is forced to the high end of seat travel, i.e., when the scissors linkage 18 is at its extreme upper position, it will cause the shaft 72 to stroke the magnet 86 beyond SW5 and across the aft-most reed switches SW6 and SW7 which are continuously energized and define a ride protected zone.

Thus, when the magnet 86 passes in proximity to and remains in proximity for the preselected time delay, switches SW6 and SW7 which are connected to the dump terminal D close, and the air spring 20 will begin to be emptied as above described. Reed switch SW7 is optional, but may preferably be employed to extend the ride protected zone at the upper end of seat travel. When both reed switches SW6 and SW7 are in use, the present invention provides a ride protection zone of about 2" of seat travel. Up stop bumpers 53 in the roller channels decelerate excessive upward accelerations of the seat carrier frame 14 by engaging shaft 72 1" before the limit of the suspension stroke when the tethers 26 are pulled taut.

At the other extreme, if the seat is forced vertically downward to the point where the scissors linkage 18 is at or below a height of 2" from the collapsed height for greater than the preselected time delay, both reed switches SW1 and SW2, which are activated as fill switches for both the high and mid seat height ranges, cause the air spring 20 to begin to fill and raise the seat carrier frame 14 away from the base frame 12. If the downward force upon the seat carrier frame 14 is extremely large, to the point where the scissors linkage 18 is 1" above the collapsed position, down stop bumpers 75 mounted on the upper surface 63 of the scissors pan 62 make contact with the undersurface 54 of the seat carrier frame 14 to decelerate the seat carrier frame 14 on the base frame 12, to prevent metal-to-metal contact.

Normal operation of the seat adjust assembly 10 when the switch 56 is located in the high H position is now described and is similar to that described above for the middle position M. In this case, however, as seen in FIG. 11, the activated set of switches that defines the desired seat height region are SW1, SW2 and SW4 for filling and SW6 and SW7 for dumping. Thus, when the switch 56 is moved from the position marked M to the position marked H, the magnet 86 on the actuator 78 will move toward and remain in the region between the switches SW4 and SW6 as can be seen in FIG. 11. Switches SW3 and SW5 are not active in the H position.

Upon toggling switch 56 from the mid-position "M" to the high position "H," movement of the actuator 78 toward the newly selected region will begin when the actuator 78 is in proximity to switches SW1, SW2 or SW4. When the magnet 86 strokes either switch SW1, SW2 or SW4, that reed switch closes and activates the compressor which fills the air spring 20 (assuming the capacitor C1 discharge time is exceeded). As the air spring 20 fills, actuator 78 moves aft along the height sensor assembly 58 over reed switch SW3, which is off and activates nothing in the circuit, and then across reed switch SW4 (assuming the magnet carrier was at or near SW2 when switch 56 was toggled) which maintains the filling state triggered by SW2 and continues to cause air to fill the air spring 20. (Reed switches SW2 and SW4 are close enough together so that there is no "dead" space between them to ensure that the compressor is turned on by at least one of them.) As the actuator 78 continues to stroke aftward on the height sensor assembly 58, and moves out of the range of SW4, SW4 opens and the compressor is turned off. SW5 is off and triggers nothing in the circuit even when actuator 78 is in proximity thereto. The magnet 86 then settles at its height adjust position, mid-way between SW4 and SW6 (near SW5).

If the seat carrier frame 14 were to continue to rise, however, eventually the actuator 78 would come in proximity to the switch designated SW6 which is continually activated as a dump switch. This would begin to decrease the volume of air in the air spring 20 and lower the seat until the magnet 86 was no longer proximal to SW6. The seat carrier frame 14 would then be maintained between the two active switches SW4 and SW6. As discussed above, switch SW7 is also continuously activated as a dump switch and if the magnet carrier 78 were to suddenly move beyond the switch SW6, it would be in proximity of switch SW7 which, like switch SW6, closes and begins to dump the air spring. Switches SW6 and SW7 are positioned close enough together so that there is no dead space between them to ensure that the solenoid valve 24 is turned on by at least one of them.

At the uppermost travel of the seat carrier frame 14, 2" above the seat carrier position when the toggle is at the setting marked H, the tethers 26 become taut. The primary purpose of the tethers 26 is to meet the required seat belt pullout standards. If for instance there is a sudden upward acceleration of the vehicle and its occupant, the seat belt (not shown) around the occupant will cause a sudden extension of the scissors linkage 18 and a tightening of the tethers 26 into their taut state. The force on the seat belt will then be transmitted through the tethers 26 through the scissors, pivot tubes 73 and 74, through the shaft assemblies 40 and 51 to the base frame 12 to the vehicle on which the base frame 12 is mounted.

Operation of the seat adjust assembly 10 when the switch 56 is located in the L position is now described and is similar to that described above for the middle M and high H positions. In this case, however, as seen in FIG. 11, the activated set of switches that defines the desired seat height range are SW1 activated as fill and SW3, SW5, SW6, SW7 activated as dump switches. Thus, when switch 56 is moved from the position marked M to the position marked L, the actuator 78 will move toward and remain in the region between the switches SW1 and SW3. Switches SW2 and SW4 are not active in the L position.

Upon toggling switch 56, movement of the actuator 78 toward the newly selected region will begin when the actuator 78 is in proximity to switches SW3, SW5, SW6, SW7. When the magnet 86 is in proximity to any of these reed switches for a duration greater than the discharge time of the capacitor C1, the switch turns on and activates the solenoid valve which begins to empty the air spring 20. As the air spring 20 empties, the actuator moves forward along the height sensor assembly 58 over reed switch SW4, which is off and activates nothing in the circuit, and then across reed switch SW3 (assuming the actuator was at or near SW5 when switch 56 was shifted) which maintains the dumping state triggered by SW5 and continues to cause air to empty from the air spring 20. As the magnet 86 moves sufficiently far from SW3 (or SW5 if that is the case), SW3 will reopen, turning off the solenoid valve 24, stabilizing the air in the air spring 20. As the magnet carrier 78 continues to stroke forward on the height sensor assembly 58, it comes into proximity to switch SW2 which is off and triggers nothing in the circuit. The magnet 86 then settles at its mid-range position, roughly mid-way between SW1 and SW3.

If the seat carrier frame 14 were to continue to drop, eventually the magnet 86 would come into proximity of the reed switch designated SW1. If the stroke was of a duration greater than the discharge time of the capacitor C1, this would cause the compressor to turn on and air spring 22 to fill, raising the seat upward and moving magnet 86 aftward away from SW1. When the magnet 86 moved sufficiently aft beyond the range of SW1, SW1 would reopen, the compressor 22 would turn off, and the air in air spring 20 would stabilize. The seat carrier frame 14 would then be maintained between the two activated switches SW1 and SW3. The seat adjust assembly 10 would then operate as described above for the positions M or H.

Figure 12:
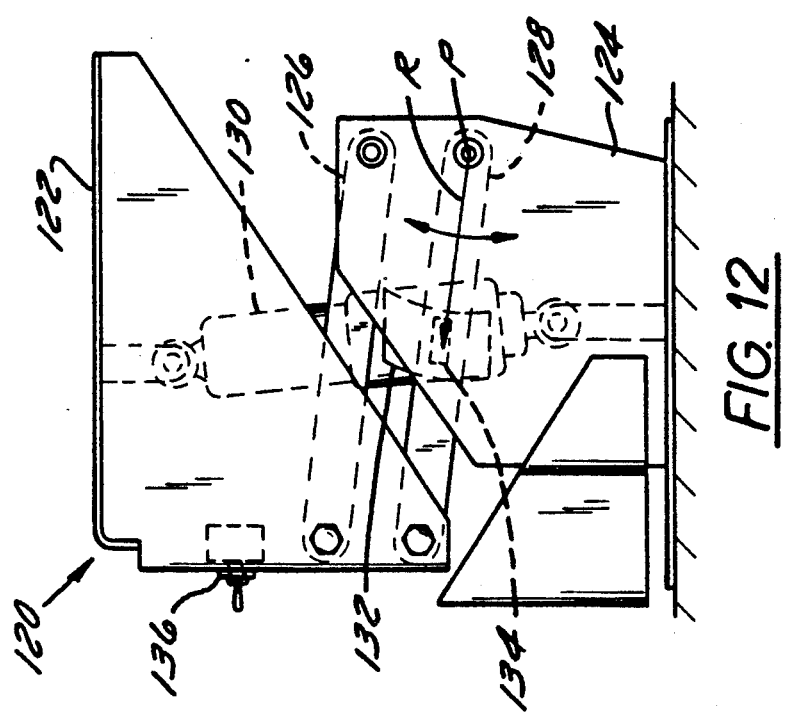
FIG. 12 is a side view of a parallelogram linkage suspension in accordance with the present invention.

Additional embodiments of the present invention are now described. Referring to FIG. 12, the suspension of the present invention is employed in a parallelogram linkage seat assembly. The seat assembly 120 depicted in FIG. 12 comprises seat carrier frame 122, base frame 124, upper parallelogram arm 126, lower parallelogram arm 128, each of which is connected between the seat carrier frame 122 and base frame 124. The upper parallelogram arm 126 is parallel and equal in length to lower parallelogram arm 128. The seat assembly 120 also comprises combined air spring and damper 130 connected between the seat carrier frame 122 and the base frame 124. A sensor assembly 132 is mounted on the base frame 124 and in the path of travel of lower parallelogram arm 128. Mounted on the adjacent point of the lower parallelogram arm 128 is an actuator 134 which strokes the sensor assembly 132 as the seat carrier frame 122 moves vertically with respect to base frame 124.

Figure 13:
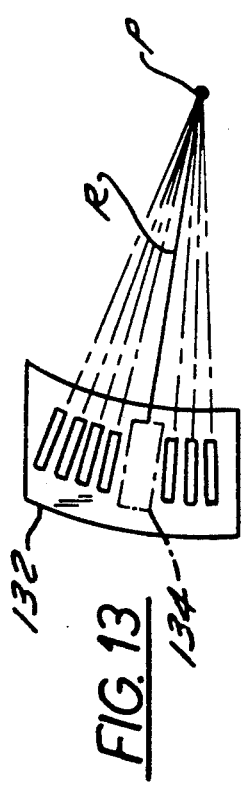
FIG. 13 is a schematic of a height sensor assembly means in the parallelogram linkage suspension of FIG. 12.

It can be seen that the lower parallelogram arm 128 which pivots at point P on the base frame 124 and the actuator 134 mounted thereon moves in an arc with respect to the sensor assembly 132 mounted on the base frame 124. As seen in FIG. 13, consequently, the sensors, which may be the sensors described above, on the sensor assembly 132 are mounted in an arcuate path which corresponds to the path of the actuator 134 across the sensor assembly 132.

The seat position is selected as before by a 3-position switch 136 which may be mounted anywhere in the cab but in FIG. 12 is shown mounted on the seat carrier frame 122. Operation of the self-leveling electronics need not be further described here because it is as described above.

Figure 15:
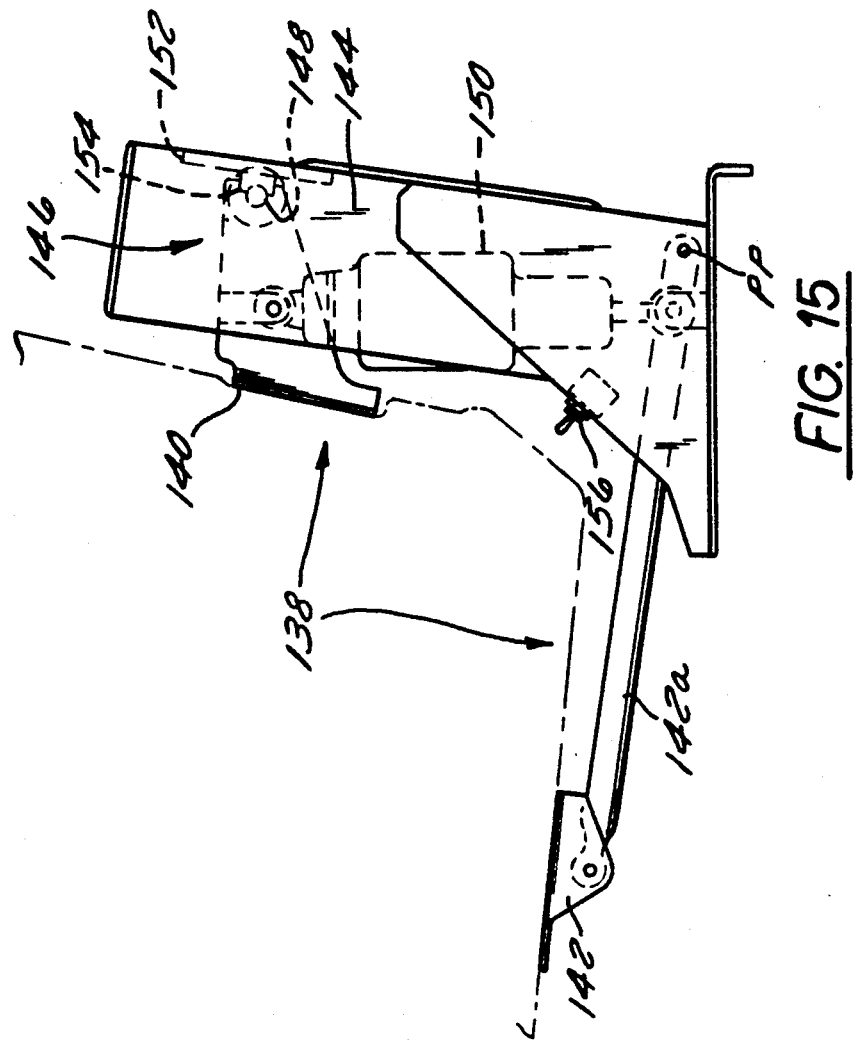
FIG. 15 is a side view of an arm and roller suspension in accordance with the present invention.
Figure 14:
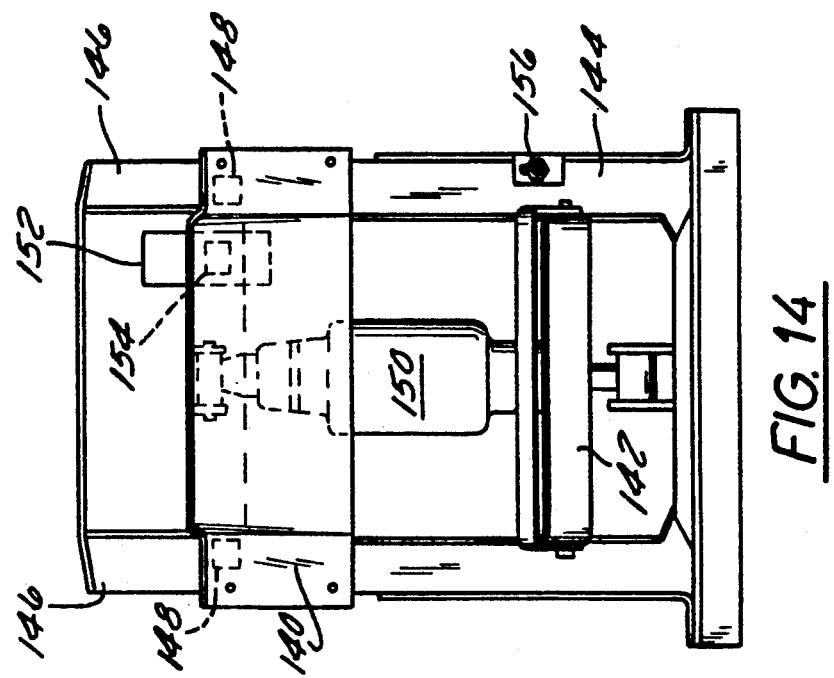
FIG. 14 is a back view of an arm and roller suspension in accordance with the present invention.

Referring now to FIGS. 14 and 15, an arm and roller suspension in which a seat frame is attached with rollers to the base frame is depicted. Seat carrier frame 138 comprises a back support portion 140 and a lower portion 142. The upper back support portion 140 of the seat carrier frame 138 is mounted for vertical travel on rollers 148 in base frame 144. Base frame 144 has therein a channel 146 in which the rollers 148 on the back support portion 140 of the seat carrier frame 138 vertically travel. The lower portion 142 of the seat carrier frame 138 is mounted on arm 142a at pivot point P on the base frame 144. Mounted between the back support portion 140 and the base frame 144 is a combined air spring and damper 150.

Mounted on the base frame 144 is a sensor assembly 152 which is in the path of movement of the back support portion 140 and the rollers 148. The rollers 148 are mounted on a shaft (not shown) in turn mounted in the back support portion 140. An actuator 154 is mounted on the shaft between the rollers 148 and, consequently, strokes across the sensor assembly 152 on the base frame 144.

The operation of the electronic self-leveling suspension with respect to the sensor assembly and the actuator is as in the embodiments described above. The air spring and damper 150 is either extended or retracted, depending upon the position of a 3-position switch 156 to move the seat carrier frame 138 up or down with respect to the base frame 144 to the selected mid-position. Consequently, the automatic weight compensation and self-leveling features of the present invention are fully achieved in this embodiment.

Figure 16:
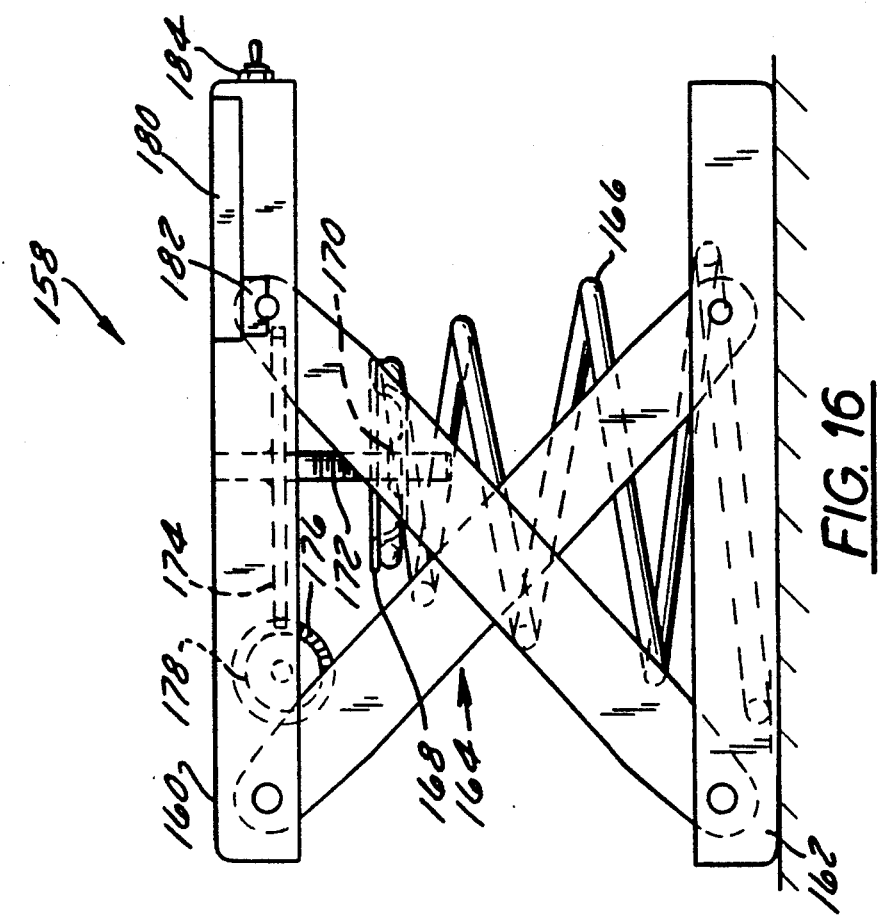
FIG. 16 is a side view of a conical spring scissors linkage suspension in accordance with the present invention.

In yet another embodiment of the electronic suspension of the present invention, the automatic weight compensation and self-leveling benefits of the invention are again achieved. Referring now to FIG. 16, a seat assembly 158 comprises a seat carrier frame 160, a base frame 162, conventional scissors linkage 164, conical spring 166, plate 168, nut 170, threaded screw 172, driven gear 174, driving gear 176, and a motor 178. A sensor assembly 180 is mounted on the underside of the seat carrier frame 160 as described in the above described scissors linkage embodiment, and an actuator 182 is mounted on the upper forward end of the scissors linkage 164 and strokes across the sensor assembly 180.

Operation of the seat assembly shown in FIG. 16 is conventional in that the conical spring 166 is sufficient to support the expected mass of the seat occupant in a seat which would be mounted on the seat carrier frame 160. The seat height for the occupant is determined by the position of the 3-position switch 184 and the sensor assembly 180 and actuator 182, and related circuitry such as ECM 106 as described above. Instead of driving an air spring or air spring and damper combination, the ECM 106 would drive the motor 178 either forward or in reverse which turns gear 176 which in turn moves gear 174 which in turn revolves threaded screw 172 in nut 170 mounted on the plate 168. Each revolution or portion thereof of threaded screw 172 in nut 170 and plate 168 would act to raise or lower the seat carrier frame 160 to the desired height determined by the sensors in the sensor assembly 180 and the position of the actuator 182 with respect thereto. The driving and driven gears 176 and 174 may of course comprise any number of different gearing combinations to transmit the rotational energy of the motor 178 to the threaded screw 172. For instance, the driving gear 176 may comprise either a worm gear or a flat gear depending upon the orientation of the motor 178.

Figure 17:
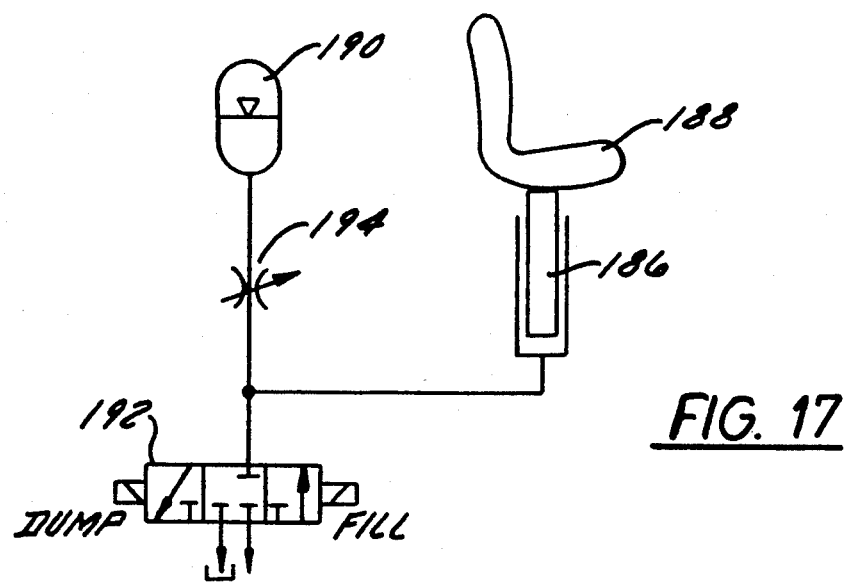
FIG. 17 is a schematic of the hydraulic circuit of a hydraulic suspension in accordance with the present invention.

In yet another embodiment of the present invention, the air spring mover means may be replaced by a hydraulic mover means. Referring now to FIG. 17, a hydraulic oil cylinder 186 moves the seat 188 vertically in conjunction with an accumulator 190 and a 3-position solenoid valve 192, and flow adjustment valve 194. The solenoid valve 192 is responsive to the dump and fill switches described above on the sensor assembly (not shown in FIG. 17). If the solenoid 192 receives a dump signal, the solenoid valve shifts right which opens the line between the accumulator 190 and the hydraulic cylinder 186 to tank. This causes the cylinder 186 to retract and the seat 188 to lower. When the 3-position solenoid valve 192 receives a fill signal from the ECM 106 due to activation of a fill switch in the sensor assembly mounted on the seat frame in any of the various ways described above, the valve 192 shifts left which causes the line between the accumulator 190 and the hydraulic cylinder 186 to pressurize thereby extending the cylinder 186 and raising the seat 188. The adjustable valve 194 may be adjusted to optimize the ride characteristics of the seat 188. The hydraulic circuit shown in FIG. 17 may be used with any number of seat assemblies including the scissors linkage, parallelogram linkage, and arm and roller linkages described above.

Figure 18:
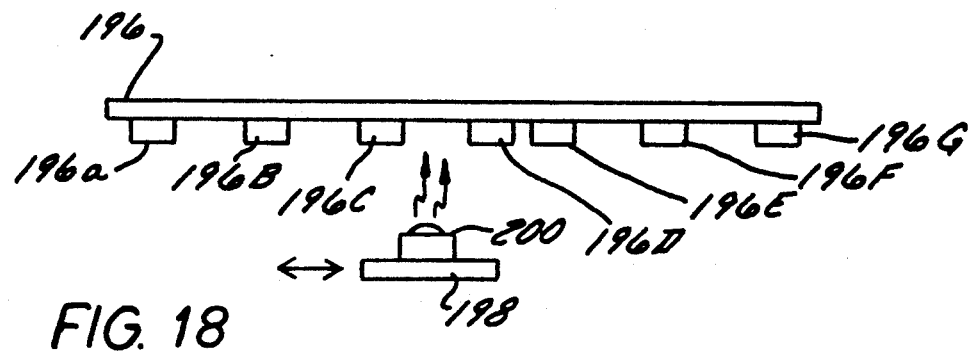
FIG. 18 is a schematic of a light-based height sensor assembly and actuator combination of the present invention.

In yet other embodiments of the present invention, the sensor assembly and actuator combination used to sense seat height may comprise other combinations as are now described. Referring to FIG. 18, a sensor assembly 196 is depicted having discrete stationary photosensors 196A-G mounted thereon. The stationary photosensors 196A-G replace the reed switches SW1-SW7 in the above described embodiment. Also depicted in FIG. 18 is an actuator 198 which may be mounted in the same manner as the actuators in the above described embodiments. Actuator 198 has mounted thereon a light source 200 which is directional and of sufficient intensity to activate any of the photosensors 196A-G as the actuator 198 moves by that particular photosensor. The light source 200 may comprise any number of different light sources such as a light emitting diode, laser diode, or other directional lamp. The light source may also comprise a remote light source with light transmitted to the actuator 198 through a fiber or other light conducting medium. The operation of the electronic suspension of the present invention employing stationary photosensors and a moving light source is otherwise the same as described above for the various embodiments.

In yet another embodiment, the sensors on the sensor assembly may comprise magnetic sensors such as Hall effect switches which are solid state switches which are turned on in the presence of a magnetic field. The associated actuator in such a case would carry, as in the reed switch embodiment, a magnet sufficient to switch the Hall effect switches.

Figure 19:
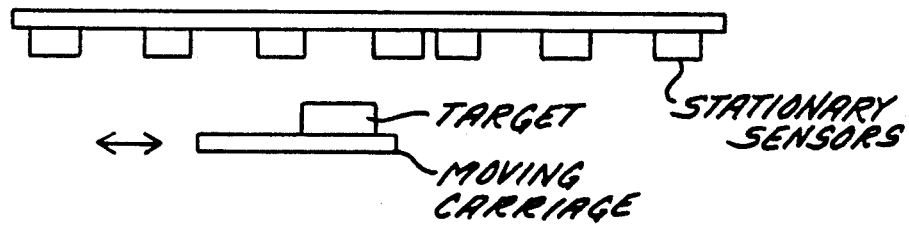
FIG. 19 is a schematic of a ferrous-based sensor assembly and actuator combination in accordance with the present invention.

FIG. 19 shows another example of a sensor assembly and actuator combination which may comprise sensors on the sensor assembly that sense a ferrous target such as ferrous sensing proximity switches. Such switches would detect the presence of a ferrous material such as metal located on the actuator. Other switches that may be used are capacitive proximity switches which change their capacitance in response to another material such as that comprising the actuator, which would pass in proximity to the capacitor proximity switch. Yet another type of switch that may be employed is a distance-triggered ultrasonic switch which may send out a signal, which signal, when it bounces back off an object in near proximity to the switch, either turns on or off the switch.

FIGS. 20-24 illustrate embodiments of the present invention which provide infinite variability of seat height adjustment. The height sensor assembly of the various embodiments described above need not be fixedly mounted to a portion of the seat carrier frame or the base frame but may be mounted so as to be infinitely adjustable in the fore-aft direction by way of an adjustment means. The adjustment means shifts the position of the sensor assembly, and the sensor means SW1-SW6 in that assembly, generally along the path of travel, of the actuator which strokes the sensor assembly. Consequently, the active height adjust position defined by the sensor means and the adjustment means and the actuator means will correspond to an infinitely variable number of seat height regions as described below.

Figure 22:
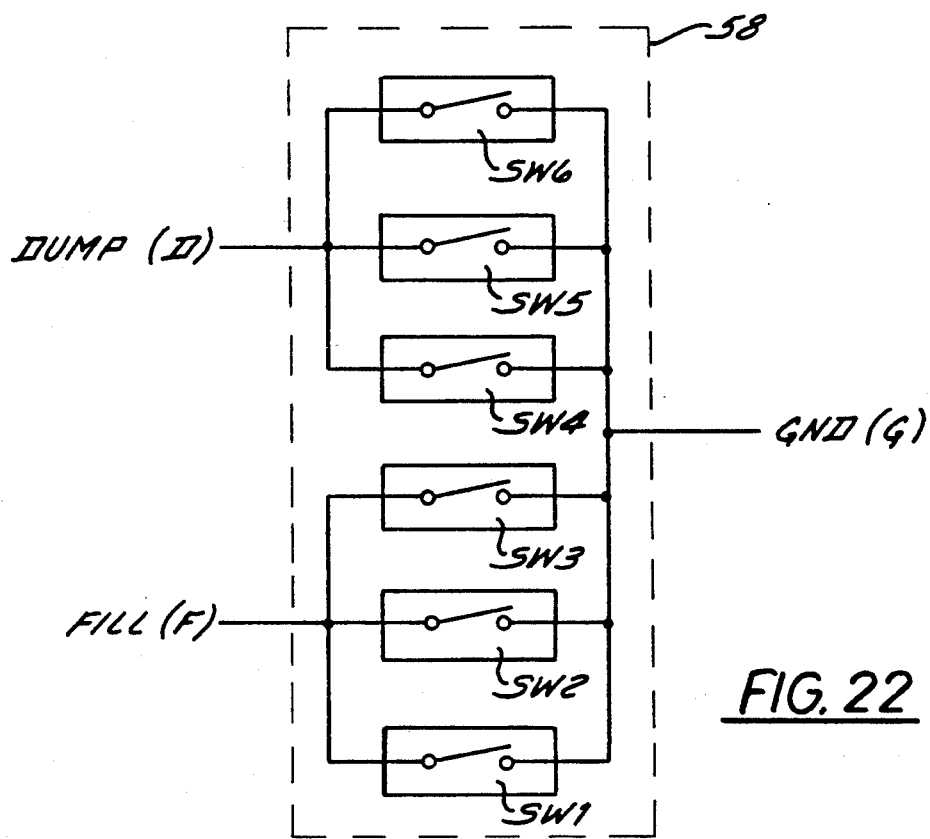
FIG. 22 is a circuit schematic of the interconnection of the sensor means of an infinitely adjustable suspension in accordance with the present invention.
Figure 20:
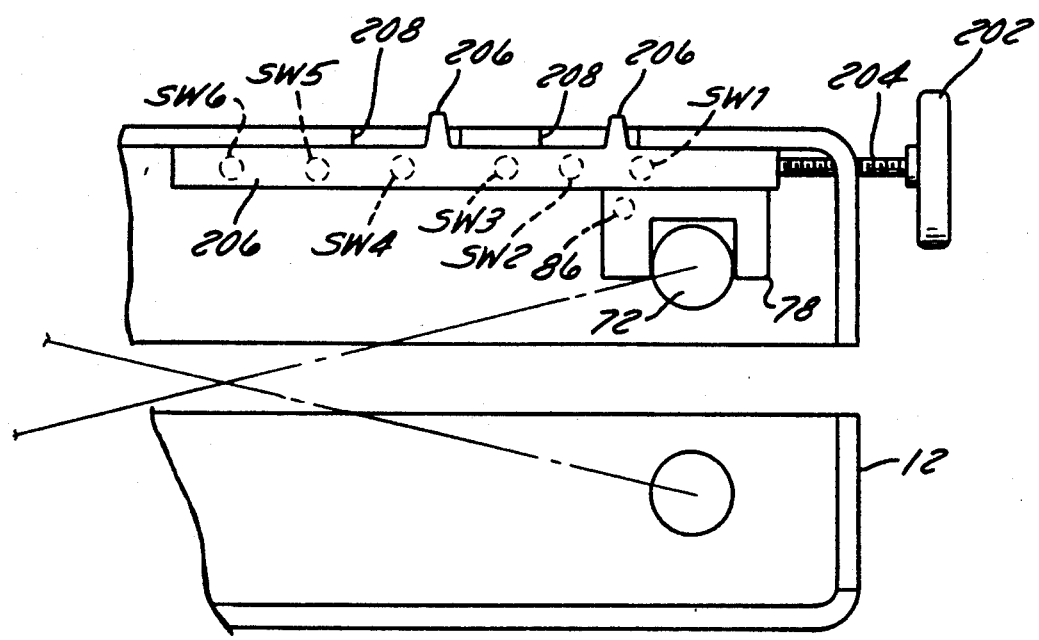
FIG. 20 is a side elevational view of an adjustment means of an infinitely adjustable electronic suspension in accordance with the present invention.
Figure 21:
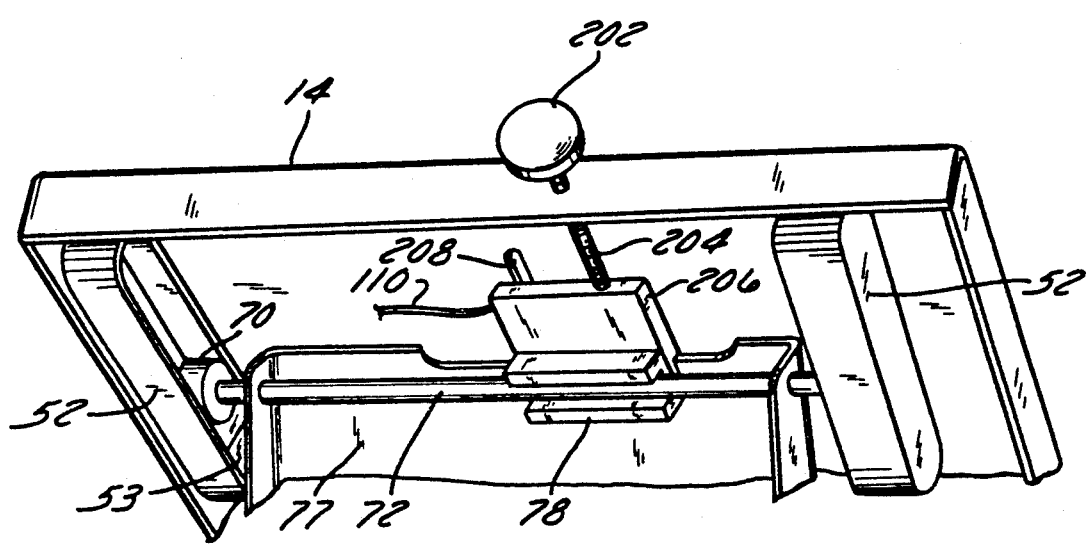
FIG. 21 is a fragmentary perspective view taken from the underside of an infinitely adjustable suspension of the present invention.

Referring now to FIGS. 20, 21 and 22, shown is an infinitely variable scissors linkage suspension including switches SW1-SW6 in adjustable height sensor assembly 206. As seen in FIGS. 20 and 21 an infinitely variable adjustment means comprises a rotatable handle 202 which turns lead screw adjustment means 204 which slidably moves the sensor assembly means 206 fore and aft guided by slots 208 in the seat carrier frame 14 to infinitely position switches SW1-SW6 for the desired seat height range.

As shown in FIG. 22, switches SW1, SW2, and SW3 in assembly 206 are continuously activated as fill switches by virtue of being connected directly between the fill terminal F of the ECM 106 and the ground terminal G of the ECM 106. The switches SW4, SW5, and SW6 are continuously activated as dump switches by virtue of being connected between the dump terminal D of the ECM 106 and the ground terminal G of the ECM 106.

The height of the suspension is determined by the position of the continuously activated pair SW3 and SW4 in the sensor assembly 206 with respect to magnet 86 in the actuator 78. The height of the suspension is increased by rotating handle 202 and lead screw 204 in a first direction, thereby moving the sensor assembly 206 rearward. As the magnet 86 in the magnet carrier 78 nears the fill switches SW1, SW2, and SW3, the switch in proximity to the magnet 86 closes, connecting the right hand side of the ECM 106 to ground and activating the ECM 106 as previously described. As the scissors linkage begins to extend, the shaft 72 begins to move aft stroking the height sensor assembly 206 in a rearward direction with actuator 78. When the magnet 86 is no longer proximal to switches SW1, SW2, and SW3 the switches reopen which opens the connection between the fill terminal F and the ground terminal G of ECM 106. Thereafter the suspension stabilizes at the newly selected height position.

The height of the suspension is decreased by rotating the handle 202 and lead screw 204 in the opposite direction thereby moving the sensor assembly 206 forward. As the magnet 86 in the magnet carrier 78 nears the dump switches SW4, SW5, and SW6, the switch in proximity to the magnet 86 closes, connecting the left side of the ECM 106 to ground and activating the ECM 106 as previously described. As the scissors linkages begins to retract, the shaft 72 begins to move forward stroking the height sensor assembly 206 in a forward direction with actuator 78. When the magnet 86 is no longer proximal to switches SW4, SW5, and SW6 the switches reopen which opens the connection between the dump terminal D and the ground terminal G of ECM 106. Thereafter the suspension stabilizes at the newly selected height position.

Figure 24:
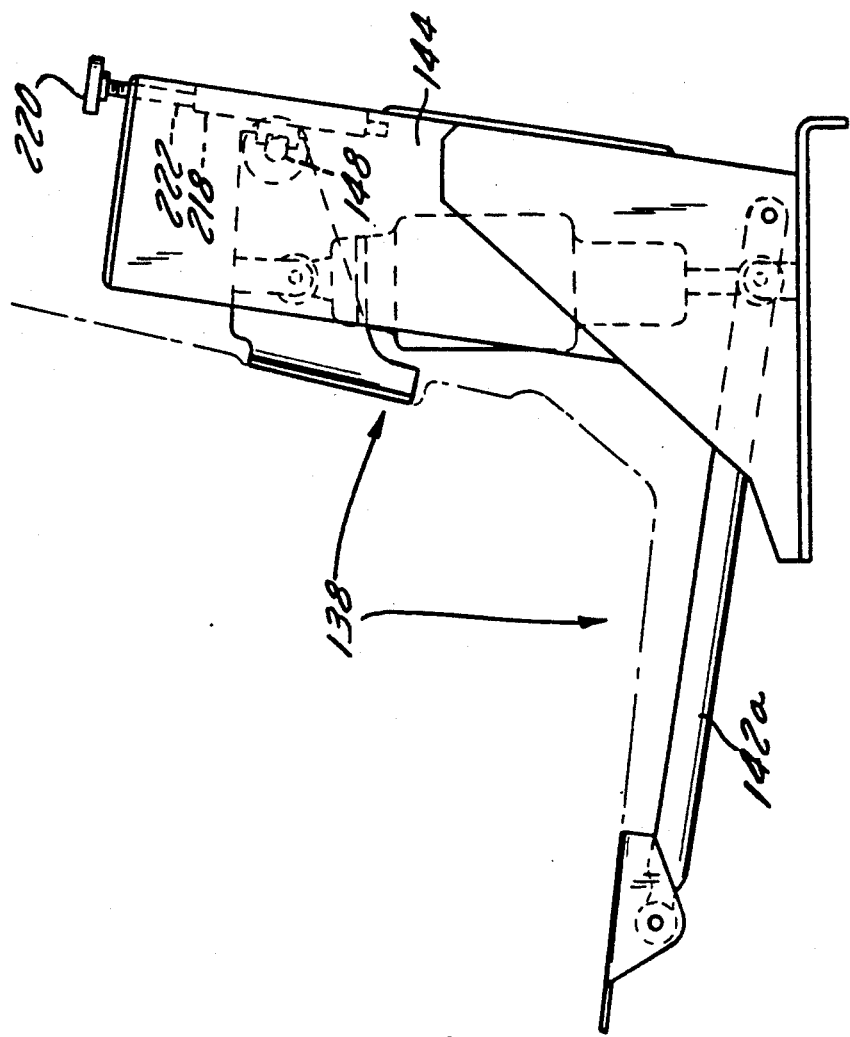
FIG. 24 is a side view of an infinitely adjustable arm and roller linkage suspension of the present invention.
Figure 23:
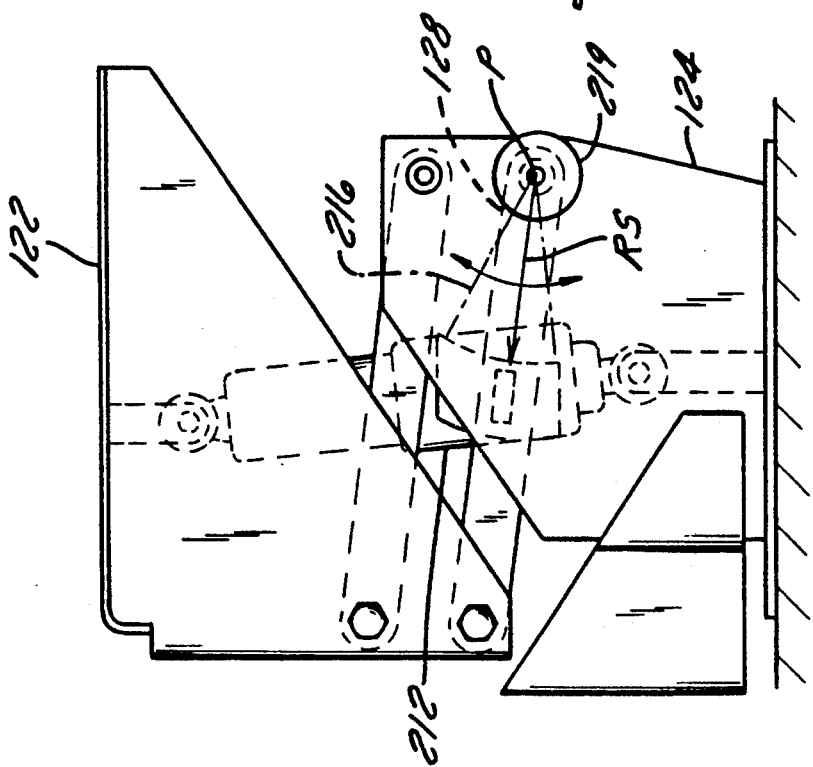
FIG. 23 is a side view of an infinitely adjustable parallelogram linkage suspension in accordance with the present invention.

An infinitely variable parallelogram suspension and an arm and roller suspension are depicted in FIGS. 23 and 24 respectively. As seen in FIG. 23, the infinitely adjustable sensor assembly means 212 for a parallelogram linkage seat assembly is mounted rotatably about pivot P about a radius of curvature RS. The adjustable sensor means 212 is infinitely adjustable by rotatable handle 214 and linkage adjustment means 216. As seen in FIG. 24, the infinitely adjustable sensor assembly means 218 for an arm and roller suspension is mounted slidably vertically on the base frame 144. The adjustable sensor means 218 is infinitely adjustable by rotatable handle 220 and lead screw adjustment means 222.

It should be appreciated that many different combinations of sensors and actuators may be used in this invention with similar beneficial results of automatic weight compensation and self-leveling in a wide variety of seat assemblies.

It is to be understood that embodiments of the present invention not disclosed herein are fully intended to be within the scope of the appended claims.

We claim:

1. A sprung seat suspension comprising a base frame; a seat carrier frame including height sensor assembly means; linkage means mounted on the base frame and operative to adjustably, vertically support the seat carrier frame with respect to the base frame and including actuator means which strokes the sensor assembly means along a path during vertical movement of the seat carrier frame; mover means mounted on the base frame and for adjustably vertically displacing the seat carrier frame from the base frame; extension means connected to the height sensor assembly means and the mover means and for selectively extending the mover means; retraction means operatively connected to the height sensor assembly means and the mover means for selectively retracting the mover means; the sensor assembly means comprising a plurality of sensor means positioned along the stroke path of the actuator means which may be selectively independently activated to selectively activate the extension means and retraction means as the actuator means strokes the sensor assembly means.

2. The suspension as defined in claim 1 further characterized in that the linkage means is a scissors linkage.

3. The suspension as defined in claim 1 further characterized in that the linkage means is a parallelogram linkage.

4. The suspension as defined in claim 1 further characterized in that the linkage means is a mechanical spring and motor driven screw thread assembly.

5. The suspension as defined in claim 1 further characterized in that the linkage means is an arm and roller linkage.

6. The suspension as defined in claim 1 wherein the sensor means comprise a plurality of reed switches and the actuator means comprises a magnet.

7. The suspension as defined in claim 1 wherein the sensor means comprise a plurality of ferrous sensing proximity switches and the actuator means comprises metal.

8. The suspension as defined in claim 1 wherein the sensor means comprise a plurality of photosensors and the actuator means comprises a light source.

9. The suspension as defined in claim 8 wherein the light source comprises an LED or laser diode.

10. The suspension as defined in claim 1 wherein the sensor means comprise a plurality of Hall effect switches and the actuator means comprises a magnet.

11. The suspension as defined in claim 1 wherein the sensor means comprise a plurality of capacitive proximity switches and the actuator means comprises a ferrous material.

12. The suspension as defined in claim 1 wherein the sensor means comprise a plurality of ultrasonic sensors.

13. The suspension as defined in claim 1 wherein the sensor means are selectively energized in sets, the energized set defining a desired actuator stroke region corresponding to a desired suspension height region.

14. The suspension as defined in claim 13 wherein the set comprises first and second sensor means, wherein the first sensor means of the activated set activates the extension means and the second activates the retraction means.

15. The suspension as defined in claim 14 further comprising a third sensor means positioned on the height sensor assembly means adjacent a side of the first sensor means distant from the second sensor means, the third sensor means also activating the extension means when stroked by the actuator, and further comprising a fourth sensor means positioned on the height sensor assembly means adjacent a side of the second sensor means distant from the first sensor means, the fourth sensor means also activating the retraction means when stroked by the actuator means, said third and fourth sensor means defining ride protection zones on either side of the desired seat height region.

16. The suspension as defined in claim 1 wherein the mover means is an air spring, the extension means is a compressor, and the retraction means is a solenoid valve.

17. The suspension as defined in claim 1 wherein the mover means is an air spring, the extension means is a solenoid valve and an external source of compressed air, and the retraction means is a solenoid valve.

18. The suspension as defined in claim 1 wherein the mover means is a hydraulic cylinder, the extension means is a solenoid valve and an external pressurized supply of hydraulic fluid, and the retraction means is a solenoid valve connected to tank.

19. The suspension as defined in claim 1 wherein the mover means comprises a threaded screw means, and the extension and retraction means comprises a motor.

20. The suspension as defined in claim 1 further comprising extensible tether means attached between the base frame and seat carrier frame.

21. The suspension as defined in claim 1 further comprising electronic control means for delaying activation of the extension means and retraction means for a predetermined duration.

22. An air suspension seat comprising a base frame, a seat carrier frame including height sensor assembly means; linkage means mounted on the base frame and operative to adjustably vertically support the seat carrier frame with respect to the base frame; air spring means mounted on the base frame for adjustably vertically displacing the seat carrier frame from the base frame; valve inlet means for compressed air for selectively filling the air spring means and connected to the height sensor assembly means; solenoid means for selectively dumping the air spring means and connected to the height sensor assembly means; actuator means positioned to stroke the height sensor assembly means during vertical movement of the seat carrier frame; the height sensor assembly means comprising (1) a first sensor means which when stroked by the actuator means activates the inlet valve means, and (2) a second sensor means which when stroked activates the solenoid means; the region between the first and second sensor means defining a desired actuator means stroke region and desired range of seat heights having a low end and a high end; the first sensor means being positioned at a point on the height sensor assembly means corresponding to the low end of the desired seat height region, and the second sensor means being positioned at a point on the height sensor assembly means corresponding to the high end of the desired seat height region.

23. An air suspension seat comprising a base frame, a seat carrier frame including height sensor assembly means; linkage means mounted on the base frame and operative to adjustably vertically support the seat carrier frame with respect to the base frame; air spring means mounted on the base frame for adjustably vertically displacing the seat carrier frame from the base frame; a compressor for selectively filling the air spring means and connected to the height sensor assembly means; solenoid means for selectively dumping the air spring means and connected to the height sensor assembly means; actuator means positioned to stroke the height sensor assembly means during vertical movement of the seat carrier frame; the height sensor assembly means comprising (1) a first sensor means which when stroked by the actuator means activates the compressor, and (2) a second sensor means which when stroked activates the solenoid means; the region between the first and second sensor means defining a desired actuator means stroke region and desired range of seat heights having a low end and a high end; the first sensor means being positioned at a point on the height sensor assembly means corresponding to the low end of the desired seat height region, and the second sensor means being positioned at a point on the height sensor assembly means corresponding to the high end of the desired seat height region.

24. A hydraulic suspension seat comprising a base frame, a seat carrier frame including height sensor assembly means; linkage means mounted on the base frame and operative to adjustably vertically support the seat carrier frame with respect to the base frame; hydraulic cylinder means mounted on the base frame for adjustably vertically displacing the seat carrier frame from the base frame; first solenoid means connected to a pressurized source of hydraulic fluid for selectively filling the hydraulic cylinder means and connected to the height sensor assembly means; second solenoid means connected to tank for selectively dumping the hydraulic cylinder means and connected to the height sensor assembly means; actuator means positioned to stroke the height sensor assembly means during vertical movement of the seat carrier frame; the height sensor assembly means comprising (1) a first sensor means which when stroked by the actuator means activates the first solenoid means, and (2) a second sensor means which when stroked activates the second solenoid means; the region between the first and second sensor means defining a desired actuator means stroke region and desired range of seat heights having a low end and a high end; the first sensor means being positioned at a point on the height sensor assembly means corresponding to the low end of the desired seat height region, and the second sensor means being positioned at a point on the height sensor assembly means corresponding to the high end of the desired seat height region.

25. A sprung seat suspension comprising a base frame; a seat carrier frame including height sensor assembly means; linkage means mounted on the base frame and operative to adjustably, vertically support the seat carrier frame with respect to the base frame and including actuator means which strokes the sensor assembly means along a path during vertical movement of the seat carrier frame; conical spring means mounted on the base frame including motor driven screw means mounted to the seat carrier frame and for adjustably vertically displacing the seat carrier frame from the base frame; the sensor assembly means comprising a plurality of sensor means positioned along the stroke path of the actuator means which may be selectively independently activated to selectively activate the motor driven screw means as the carrier means strokes the sensor assembly means.

26. The invention as defined in claim 22, 23, 24, or 25 wherein the linkage means is a scissors linkage.

27. The invention as defined in claim 22, 23, or 24 wherein the linkage means is a parallelogram linkage.

28. The invention as defined in claim 22, 23, or 24 wherein the linkage is an arm and roller linkage.

29. The suspension as defined in claim 22, 23, 24, or 25 wherein the sensor means comprise a plurality of reed switches and the actuator means comprises a magnet.

30. The suspension as defined in claim 22, 23, 24, or 25 wherein the sensor means comprise a plurality of ferrous sensing proximity switches and the actuator means comprises metal.

31. The suspension as defined in claim 22, 23, 24, or 25 wherein the sensor means comprise photosensors and the actuator means comprises a light source.

32. The suspension as defined in claim 22, 23, 24, or 25 wherein the sensor means comprise a plurality of Hall effect switches and the actuator means comprises a magnet.

33. The suspension as defined in claim 24 wherein the hydraulic cylinder means comprises a hydraulic cylinder in fluid communication with an accumulator.

34. The suspension as defined in claim 22, 23, 24, or 25 further comprising electronic contral means for delaying activation of the extension means and retraction means for a predetermined duration.

35. A sprung seat suspension comprising a base frame; a seat carrier frame including height sensor assembly means; linkage means mounted on the base frame and operative to adjustably, vertically support the seat carrier frame with respect to the base frame and including actuator means which strokes the sensor assembly means along a path during vertical movement of the seat carrier frame; mover means mounted on the base frame and for adjustably vertically displacing the seat carrier frame from the base frame; extension means connected to the height sensor assembly means and the mover means and for selectively extending the mover means; retraction means connected to the height sensor assembly means and the mover means for selectively retracting the mover means; the sensor assembly means comprising a plurality of sensor means positioned along the stroke path of the actuator means which are continuously activated to activate the extension means and retraction means as the carrier means strokes the sensor assembly means, the sensor assembly means being infinitely adjustable to provide infinitely variable vertical adjustment.

36. The suspension as defined in claim 35 further characterized in that the linkage means is a scissors linkage.

37. The suspension as defined in claim 35 further characterized in that the linkage means is a parallelogram linkage.

38. The suspension as defined in claim 35 further characterized in that the linkage means is a mechanical spring and motor driven screw thread assembly.

39. The suspension as defined in claim 35 further characterized in that the linkage means is an arm and roller linkage.

* * * * *